United States Patent
Zhou et al.

(10) Patent No.: US 9,501,555 B2
(45) Date of Patent: Nov. 22, 2016

(54) REAL-TIME DATA MANAGEMENT FOR A POWER GRID

(71) Applicant: Accenture Global Services Limited, Dublin (IE)

(72) Inventors: Qin Zhou, Beijing (CN); Zhihui Yang, Beijing (CN); Xiaopei Cheng, Beijing (CN); Yan Gao, Beijing (CN); Guo Ma, Beijing (CN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/859,244

(22) Filed: Sep. 18, 2015

(65) Prior Publication Data
US 2016/0012120 A1    Jan. 14, 2016

Related U.S. Application Data

(60) Division of application No. 13/777,688, filed on Feb. 26, 2013, now Pat. No. 9,141,653, which is a continuation of application No. PCT/CN2012/084026, filed on Nov. 2, 2012.

(51) Int. Cl.
| | |
|---|---|
| G06F 3/00 | (2006.01) |
| G06F 17/30 | (2006.01) |
| G06F 5/14 | (2006.01) |
| H04L 12/861 | (2013.01) |
| G06F 5/06 | (2006.01) |
| H04L 12/879 | (2013.01) |
| G06F 3/06 | (2006.01) |
| G06F 12/02 | (2006.01) |

(52) U.S. Cl.
CPC ............ *G06F 17/30598* (2013.01); *G06F 5/14* (2013.01); *G06F 17/30241* (2013.01);
(Continued)

(58) Field of Classification Search
None
See application file for complete search history.

(56) References Cited

U.S. PATENT DOCUMENTS

| | | |
|---|---|---|
| 7,907,722 B2 | 3/2011 | Timmermans |
| 7,995,233 B2 | 8/2011 | Liu et al. |

(Continued)

FOREIGN PATENT DOCUMENTS

| | | |
|---|---|---|
| CN | 1756217 A | 4/2006 |
| CN | 102043795 A | 5/2011 |

(Continued)

OTHER PUBLICATIONS

International Search Report and Written Opinion of the International Searching Authority, dated Aug. 15, 2013, pp. 1-18, issued in International Application No. PCT/CN2012/084026, The State Intellectual Property Office, the P.R. China, Beijing, China.

*Primary Examiner* — Henry Tsai
*Assistant Examiner* — Aurangzeb Hassan
(74) *Attorney, Agent, or Firm* — Brinks Gilson & Lione

(57) ABSTRACT

A real-time data management system, a system, method, apparatus and tangible computer readable medium for accessing data in a power grid are described for controlling a transmission delay of real-time data delivered via a real-time bus, and for delivering real-time data in a power grid. A unified data model covering various organizations and various data resource is described. Further, a management scheme for clustered data is described to provide a transparent and high speed data access. The solutions described may efficiently manage the high volume of real-time data and events, provide data transmission with a low latency, provide flexible extension of both the number of data clusters and the number of databases to ensure high volume data storage, and achieve a high speed and transparent data access. Additionally, rapid design and development of analytical applications, and the near real-time enterprise decision-making business may be enabled.

21 Claims, 21 Drawing Sheets

(52) U.S. Cl.
CPC ....... *G06F17/30312* (2013.01); *G06F 3/0656* (2013.01); *G06F 5/065* (2013.01); *G06F 12/023* (2013.01); *H04L 49/90* (2013.01); *H04L 49/901* (2013.01)

(56) References Cited

U.S. PATENT DOCUMENTS

| | | |
|---|---|---|
| 2005/0215265 A1 | 9/2005 | Sharma |
| 2009/0080024 A1* | 3/2009 | Liu .................. G06F 3/1204 358/1.16 |
| 2009/0080376 A1 | 3/2009 | Almgren et al. |
| 2011/0058211 A1* | 3/2011 | Noecker, Jr. .......... G06F 3/1221 358/1.15 |
| 2013/0193767 A1 | 8/2013 | Carralero et al. |
| 2014/0009552 A1 | 1/2014 | Liu et al. |

FOREIGN PATENT DOCUMENTS

| | | |
|---|---|---|
| CN | 102096684 A | 6/2011 |
| CN | 102101393 A | 6/2011 |
| CN | 102609463 A | 7/2012 |
| EP | 2 081 123 A1 | 7/2009 |

* cited by examiner

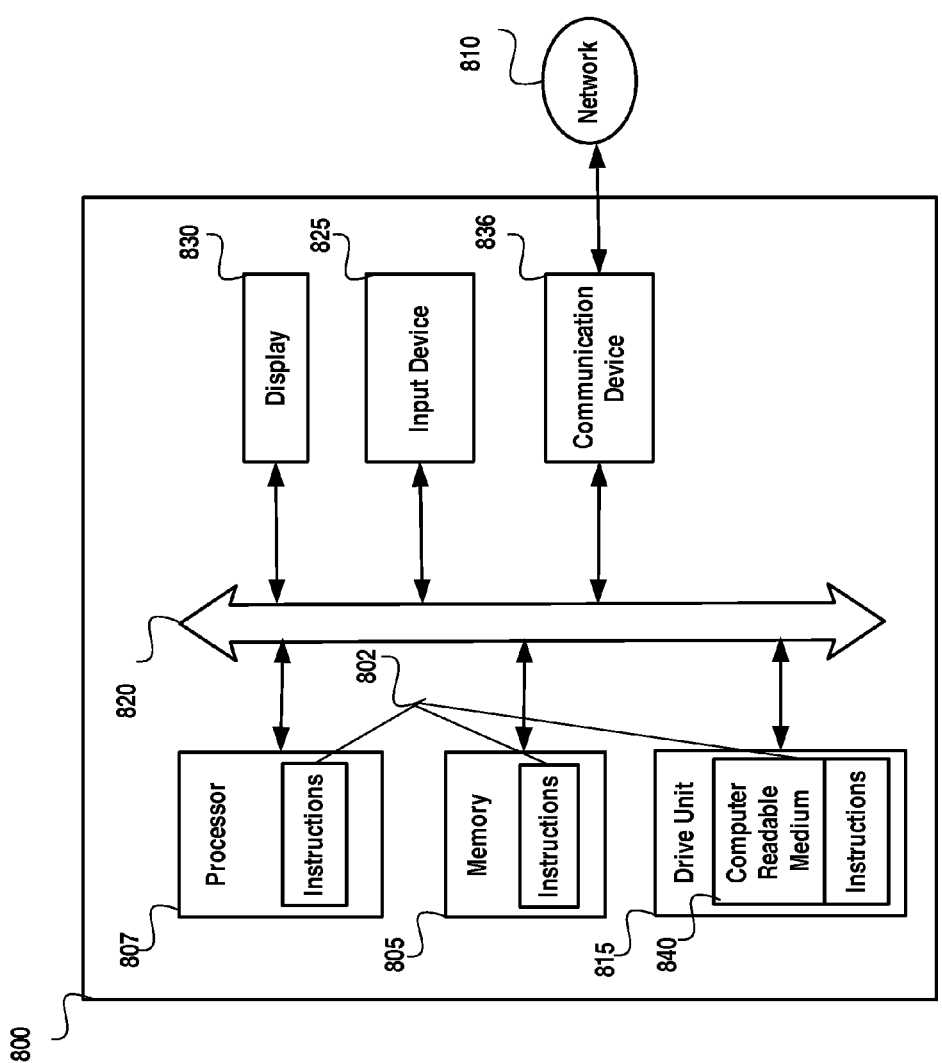

REAL-TIME DATA MANAGEMENT FOR A POWER GRID

PRIORITY CLAIM

This application is a divisional of U.S. patent application Ser. No. 13/777,688, filed on Feb. 26, 2013, which is a continuation of Patent Cooperation Treaty (PCT) patent application Serial No. PCT/CN2012/084026, filed on Nov. 2, 2012.

BACKGROUND OF THE INVENTION

1. Technical Field

Embodiments of the present disclosure generally relate to the field of power grid management technology and more particularly to a real-time data management system, a system, method, apparatus and tangible computer readable medium for accessing data in a power grid, a system, method, apparatus and tangible computer readable medium for controlling a transmission delay of real-time data delivered via a real-time bus, and a system, method, apparatus and tangible computer readable medium for delivering real-time data in a power grid.

2. Background

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as, for example, 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as, for example, 138K Volts). From a transmission substation, smaller transmission lines (such as, for example, sub-transmission lines) transmit the intermediate voltage to distribution substations. At the distribution substations, the intermediate voltage may be again stepped down to a "medium voltage" (such as, for example, from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as, for example, 120V). The consumer voltage may then be used by the consumers.

One or more power companies whose main responsibility is to supply reliable and economic electricity to their customers. These power companies may manage the power grid, including planning, operation, and maintenance related to the power grid. However, the management of the power grid is often inefficient and costly. For example, a power company that manages the local distribution network may manage faults that may occur in the feeder circuits or on circuits, called lateral circuits, which branch from the feeder circuits. The management of the local distribution network often relies on telephone calls from consumers when an outage occurs or relies on field workers patrolling and monitoring the local distribution network.

Power companies have attempted to upgrade the power grid to be a "smart grid" by applying the state-of-the-art IT and power engineering technologies. With the development of the smart grid, a large number of utilities are deploying Advanced Metering Infrastructure (AMI), Phase Measurement Unit (PMU) and other online monitoring equipment. These equipments provide different data to applications and may adhere to different latency requirements. For example, the PMU has a data frequency of 20 to 50 milliseconds; a Supervisory Control And Data Acquisition/Energy Management System (SCADA/EMS) has a data frequency of 1 to 5 seconds; the AMI has a data frequency of 5 to 15 minutes; device monitoring system has a data frequency of 1 to 5 minutes; and an event should be notified immediately when the event happens. Moreover, each of devices will produce a large amount of data This means that a large amount of data is generated from different originations, business units and systems.

FIG. 1 schematically illustrates various latency levels of data in an example existing power system. As illustrated in FIG. 1, data acquired from sensor devices will be directly provided to a high speed/real-time analytical application with a latency that ranges from milliseconds to seconds; the acquired data will be stored in a real-time or sub real-time database for a purpose of medium speed/real-time analytical with a latency that ranges from seconds to minutes; the acquired data will be also stored in a database for historical data for using by a transaction analytical application with a latency that ranges from minutes to days; the acquired data are further stored in a business data repository for using by a business intelligence application with a latency that ranges from days to months. It can be seen that these data are time series continuous data with different latency varying from milliseconds to months and they are constantly increasing. Additionally, measurement objects are continuously increasing and large events might also be suddenly generated in a very short period of time when a contingency occurs, which all will rapidly increase the data volume. This constantly increasing data have become a challenge for the power system management, and hence there is a critical demand for efficiently managing the high volume of data in the art.

SUMMARY

In view of the above, the present disclosure presents a real-time data management scheme to at least alleviate or mitigate at least part of the above problems in the prior art.

According to a first aspect of the present disclosure, there is provided a system for accessing data in a power grid. The system may comprise at least one processor and at least one memory storing computer executable instructions, wherein the at least one memory and the computer executable instructions are configured to, with the at least one processor, cause the system to: create, based on a request for accessing data, an execution unit for the request, wherein the data are divided, based on their characteristics, into a plurality of data clusters and stored in different types of databases; locate a position of the data using a global identifier for a measurement point with which the data are associated; and access the data by the execution unit based on the request.

According to a second aspect of the present disclosure, there is provided a system for controlling a transmission delay of real-time data delivered via a real-time bus. The system may comprise at least one processor and at least one memory storing computer executable instructions, wherein the at least one memory and the computer executable instructions are configured to, with the at least one processor, cause the system to: monitor status of a data buffer for the real-time bus in which the real-time data are buffered for delivery; and adjust data consumption speed based on the status of the data buffer to control the delay of the real-time data.

According to a third aspect of the present disclosure, there is provided a system for delivering real-time data in a power grid. The system may comprise at least one processor and at least one memory storing computer executable instructions, wherein the at least one memory and the computer executable instructions are configured to, with the at least one processor, cause the system to monitor traffic status of a plurality of real-time buses that include a real-time data bus for delivering the real-time data and another real-time bus; and assign, based on the traffic status of the real-time buses, to deliver a portion of the real-time data on the another real-time bus.

According to a fourth aspect of the present disclosure, there is provided a method for accessing data in a utility grid. The method may comprise creating, based on a request for accessing data, an execution unit for the request, wherein the data are divided, based on their characteristics, into a plurality of data clusters and stored in different types of databases; locate a position of the data using a global identifier for a measurement point with which the data are associated; and accessing the data by the execution unit based on the request.

According to a fifth aspect of the present disclosure, there is provided a method for controlling a transmission delay of real-time data delivered via a real-time bus. The method may comprise monitoring status of a data buffer for the real-time bus in which the real-time data are buffered for delivery; and adjusting data consumption speed based on the status of the data buffer to control the delay of the real-time data.

According to a sixth aspect of the present disclosure, there is provided a method for delivering real-time data in a power grid. The method may comprise monitoring traffic status of a plurality of real-time buses that include a real-time data bus for delivering the real-time data and at least one another real-time bus; and delivering, based on the traffic status of the real-time buses, a portion of the real-time data on the another real-time bus.

According to a seventh aspect of the present disclosure, there is provided an apparatus for accessing data in a power grid, wherein the data are divided, based on their characteristics, into a plurality of data clusters and stored in different types of databases. The apparatus may comprise a data clustering management server module, configured to create, based on a request for accessing data, an execution unit for the request and destroy the execution unit based on disclosure of the request; a data clustering management configuration module, configured to locate a position of data using a global identifier for a measurement point with which the data are associated; and the execution unit, dynamically created for the request and configured to access the data in the position of data based on the request and provide the result for the request.

According to an eighth aspect of the present disclosure, there is provided an apparatus for controlling a transmission delay of real-time data delivered via a real-time bus. The apparatus may comprise a status monitor module, configured to monitor status of a data buffer for the real-time bus in which the real-time data are buffered for delivery; and a speed adjustment module, configured to adjust data consumption speed based on the status of the data buffer to control the delay of the real-time data.

According to a ninth aspect of the present disclosure, there is provided an apparatus for delivering real-time data in a power grid. The apparatus may comprise a bus monitor module, configured to monitor traffic status of real-time buses that include a real-time data bus for delivering the real-time data and another real-time bus; and a balance engine module configured to assign, based on the traffic status of the real-time buses, the another real-time bus to deliver a portion of the real-time data to balance loads between the real-time buses.

According to a tenth aspect of the present disclosure, there is provided a real-time data management system for a power grid. The system may comprise a data collection module, configured to collect data in real time from various data sources; a data model module configured to provide a unified data model covering various originations and various data sources for the system; a data process module configured to process the collected data; a data clustering management module, configured to divide data based on their characteristics, into a plurality of data clusters, store them in different types of databases pursuant to data clustering configuration rules, and provide an access to data in the different data cluster; a data access service module configured to provide data access service management to clients; an event integration and process module configured to integrate and process associated events of the power grid and analyze and predict healthy status of the utility gird based on the associated events; and a system management module configured to provide an overall management on the modules in the system.

According to an eleventh aspect of the present disclosure, there is provided a tangible computer-readable medium having a plurality of instructions executable by a processor to access data in a power grid. The tangible computer-readable medium may comprise instructions configured to perform steps of the method according to the fourth aspect of the present disclosure.

According to a twelfth aspect of the present disclosure, there is provided a tangible computer-readable medium having a plurality of instructions executable by a processor to control a transmission delay of real-time data delivered via a real-time bus. The tangible computer-readable medium may comprise instructions configured to perform steps of the method according to the fifth aspect of the present disclosure.

According to a thirteenth aspect of the present disclosure, there is provided a tangible computer-readable medium having a plurality of instructions executable by a processor to deliver real-time data in a power grid. The tangible computer-readable medium comprises instructions configured to perform steps of the method according to the sixth aspect of the present disclosure.

With embodiments of the present disclosure, it may efficiently manage the high volume of real-time data and events, achieve a high speed and transparent data access, support the flexible extension of both the number of data clusters and the number of databases, and ensure data transmission with a low latency. Additionally, it also enables a rapid design and development of analytical applications, and support the near real-time enterprise decision-making business.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein:

FIG. 8 schematically illustrates a general computer system, programmable to be a specific computer system, which may represent any of the computing devices referenced herein.

DETAILED DESCRIPTION

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced here. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

The embodiments of the present disclosure are intended to efficiently manage data constantly increasing in the power system. In view of that, the present inventors propose a new architecture for real-time data management system, which is intended to efficiently manage a high volume of data in the power grid, including, such as, data collection, data processing, data storage, data accessing, complex event processing, global measurement point management, etc.

In the real-time data management system of the present disclosure, a unified data model covering various organizations and various data resources and a management scheme for clustered data are designed to provide a transparent and high speed data access. Besides, multi-bus collaboration and bus performance optimization approaches are utilized to improve efficiency and performance of the buses. The real-time data management system may also include an event integration and complex event process component to provide a credible prediction on status of the power grid. Hereinafter the architecture for the real-time data management system and main components thereof will be described in detail.

Overall Architecture

Figure 1:
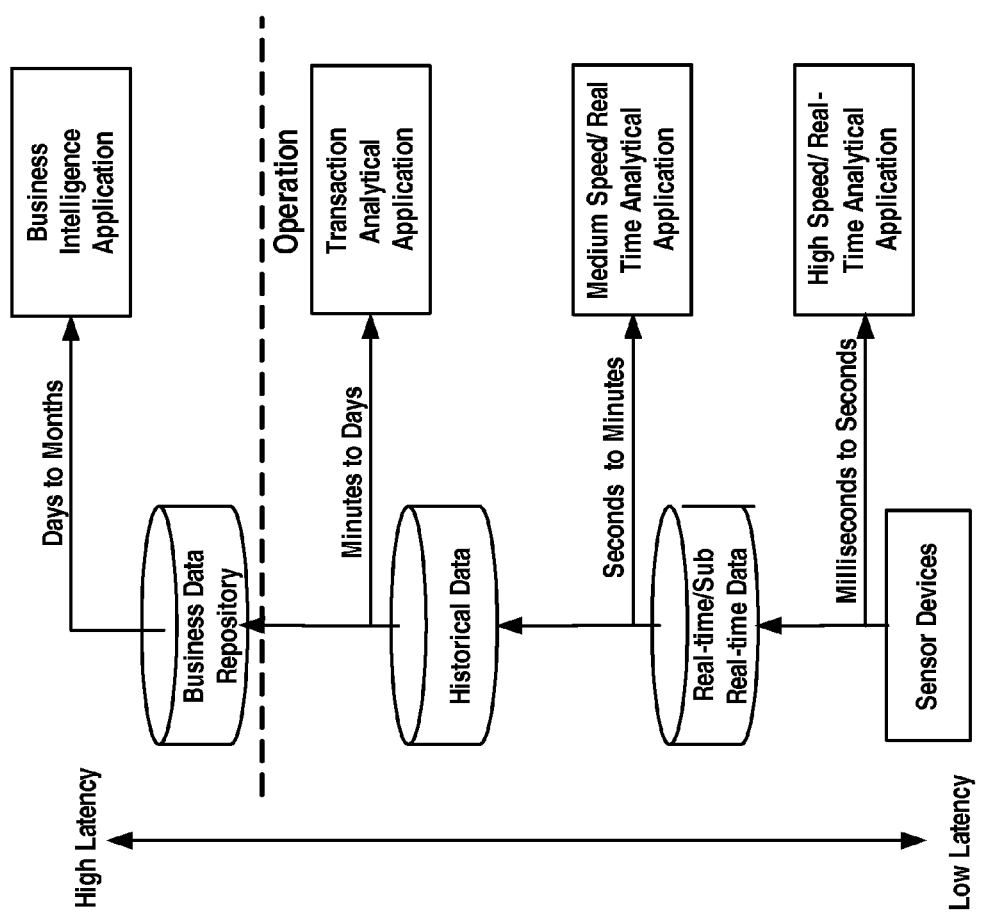
FIG. 1 schematically illustrates various latency levels of data in an example existing power system.
Figure 2:
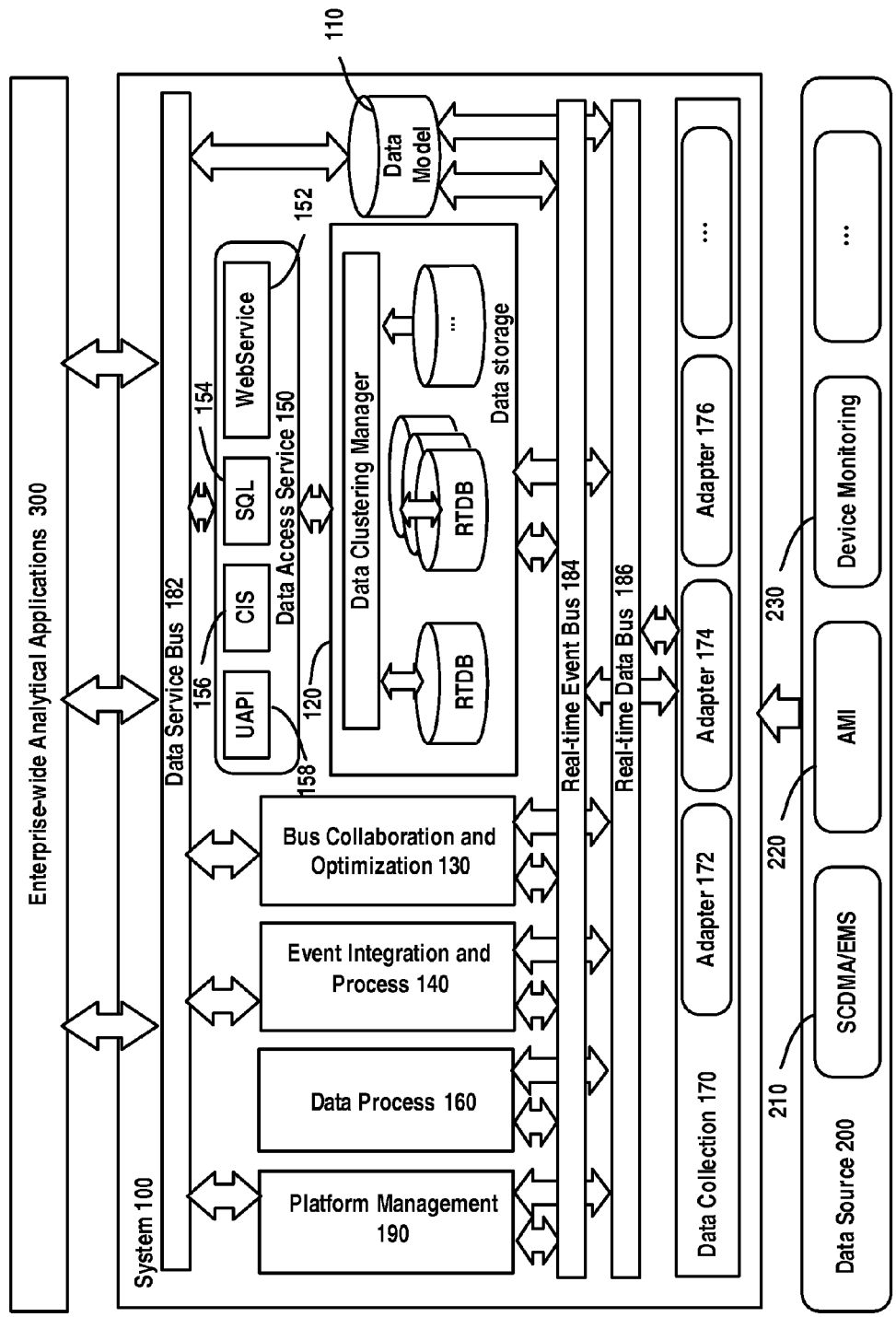
FIG. 2 schematically illustrates a diagram of an architecture of a real-time data management system according to an example embodiment of the present disclosure.

First reference is made to FIG. 2 to describe an overall architecture of the real-time data management system according to an example embodiment of the present disclosure.

As illustrated in FIG. 2, the overall architecture may comprise system 100, data source 200 and enterprise-wide analytical applications 300. The system 100 may collect data from data source 200 over a real-time event bus 184 and real-time data bus 186 and provide data services for example for enterprise-wide analytical applications 300 over a data service bus (which may be also called as operational service bus) 182 for further analytical purpose such as, device loading analysis, device conditional maintenance, system stability analysis, etc. The data source 200 may include any source from which data can be acquired or collected.

Examples of the data source 200 may include various sensors, monitoring equipments, management unit, management system, or any other device or system. As an example, data source 200 may include SCADA/EMS 210, AMI 220, device monitoring equipments 230, PMU, power quality monitoring equipments, etc. The enterprise-wide analytical applications 300 can be any commercial or custom analytics applications that are primarily operating from the data provided by the system 100.

In the architecture illustrated in FIG. 2, there may be for example three buses: a data service bus 182; a real-time event bus 184; and a real-time data bus 186. The data service bus 182 serve mainly for communicating with applications outside the system 100 while the real-time event bus 184; and the real-time data bus 186 are used for the internal communication in the system 100. Particularly, the data service bus 182 may also be called as an operational service bus, which may provide data service to the utility back office applications such as enterprise-wide analytical applications 300. The real-time event bus 184 is a bus dedicatedly for event processing, over which may be transmitted various events occurring in the industry system. Events may refer to any occurrence of interest in the industry system. Thus, events may include undesired or abnormal conditions occurring in the industry system. On the other hand, events may include normal conditional information as well. The real-time data bus 186 is a high speed bus, over which data collected from the data source can be transmitted to the system various modules in the system 100.

Referring back to FIG. 2, the system 100 may further comprise a data model module 110, a data clustering management module 120, a bus collaboration and optimization module 130 and an event integration and process module 140, data access service module 150, data process module 160, data collection module 170, and platform management module 190.

The data model module 110 may store a data model designed in the present disclosure to provide a unified data model covering various originations (for example, power transmissions, electricity distribution, customers etc.) and various data sources (for example, SCADA/EMS 210, AMI 220, device monitoring equipment 230, etc.) in the system. With the data model, various data from different data source can be managed, attribute definitions for all data objects can be unified and object oriented approach can be used in information integration. Therefore a uniform and centralized data management may be achieved. Additionally, a unique global measurement point management may be implemented on an enterprise wide basis.

The data clustering management 120 is a module mainly for managing a high volume of data in the real-time system. The data clustering management module 120 may divide the data based on their characteristics, into a plurality of data clusters. These data clusters may include, for example, a real-time data cluster, a sub real-time data cluster, event and other data cluster, etc. Then, the data can be stored in different types of databases (such as real-time database, relational database) pursuant to data clustering configuration rules. Besides, the data clustering management module 120 may be responsible for providing an access to data in the different data cluster.

The bus collaboration and optimization module 130 may perform multi-bus collaboration and bus performance optimization. In the present disclosure, data writing flow, data access flow and event data flow are all separate and the bus collaboration and optimization module may perform optimal procedures and rules to achieve a low latency of data delivery and provide bus load dynamic balancing by using a flexible on-demand multi-bus configuration.

The event integration and process module 140 may provide event-related services, which will integrate and process associated events of the power grid from various different events and provide analysis and prediction (such as health prediction) on the utility gird based on the associated events.

The data access service module 150 is to provide data access service management to clients. As illustrated, it may include the following modules: WebService 152, CIS (Component Integration Services) 154, SQL (Structured Query Language) 156, and UAPI (Universal Application Programming Interface) 158. Other such components may also be included as a part of the data access service module 150. These components may provide high speed and transparent data access services for various applications based on different data service technologies. On one hand, the data access service module 150 may translate data access requests in various formats from various applications into a uniform internal format for processing by the data clustering management 120. On the other hand, the data access service module 150 may convert results for data access request into a format which can be interpreted by corresponding applications. Moreover, the data access service module 150 may also perform access management on data access to ensure clients access the database according to their different privileges.

The data process module 160 may be responsible for processing data such as performing data conversion, data quality check and any other proper data process.

The data collection module 170 may be configured to collect the data from the data source 200, which can include a plurality of adapters respectively used for various data sources. The adapters may collect the data from respectively data sources and convert the data in different format into a uniform format for facilitating subsequent processing and management. The collected data can be transmitted, dependent on the characteristic of the data, over the real-time data bus or the real-time event bus to respective modules for subsequent processing, such as analysis, storage, etc.

The platform management module 190 may provide an overall management on the modules in the system. In the system, there may be a number of modules and the platform management module will monitor the modules to ensure their normal operations.

The IT environment of the architecture is SOA-compatible. SOA (Service-Oriented Architecture) is a computer system architectural style for creating and using business processes, packaged as services, throughout their lifecycle. The SOA also defines and provisions the IT infrastructure to allow different applications to exchange data and participate in business processes. However, the use of SOA in the present disclosure is optional.

It should be appreciated that, though FIG. 2 has depicted the above modules, more modules may be added to achieve more functionality; some modules may be removed to omit a corresponding functionality; or some modules may be substituted by others to provided substitution functionalities. Besides, it should be noted that there are illustrated three buses; however, fewer or greater numbers of buses may be used to carry various data in the power grid.

Next, several components of the system architecture will be described in details.

Data Model

In the present disclosure, there is designed a unified data model which will be described with reference to FIGS. 3A to 3D which schematically illustrate a data model according to an example embodiment of the present disclosure.

Figure 3A:
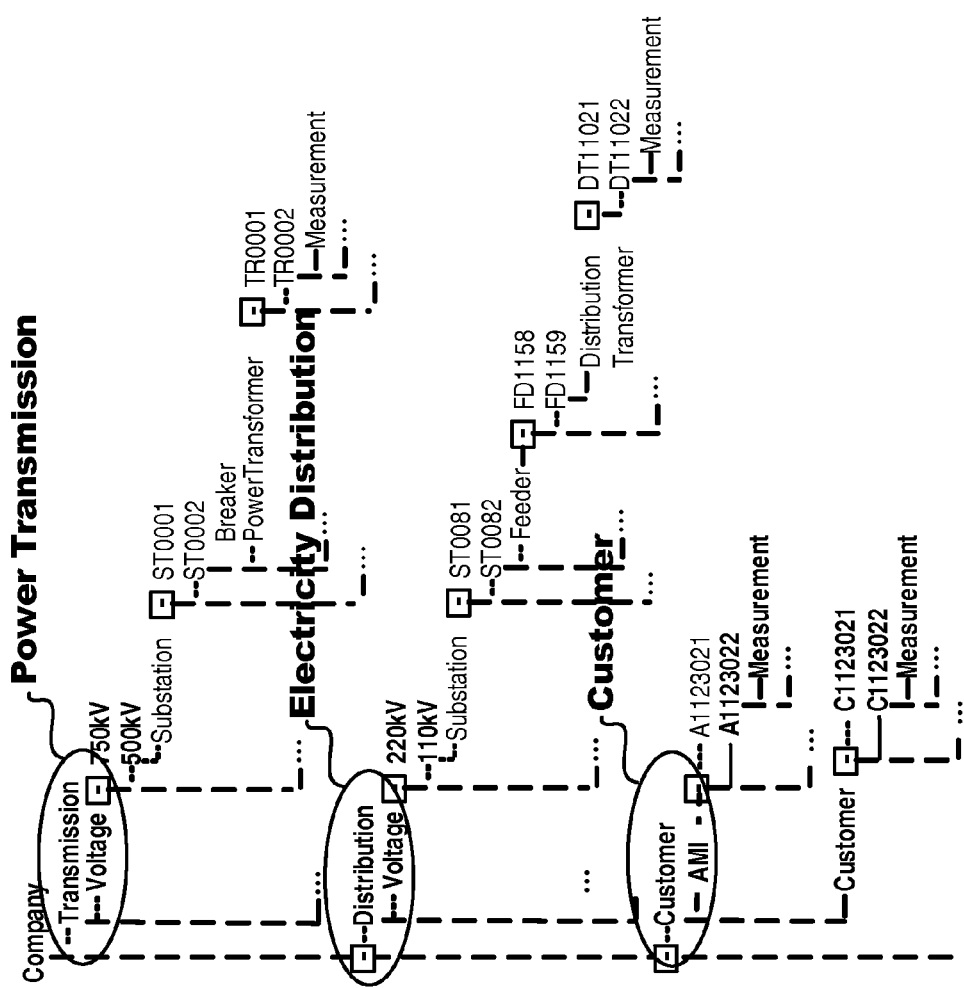
FIG. 3A schematically illustrates a diagram of a data model according to an example embodiment of the present disclosure.
Figure 3B:
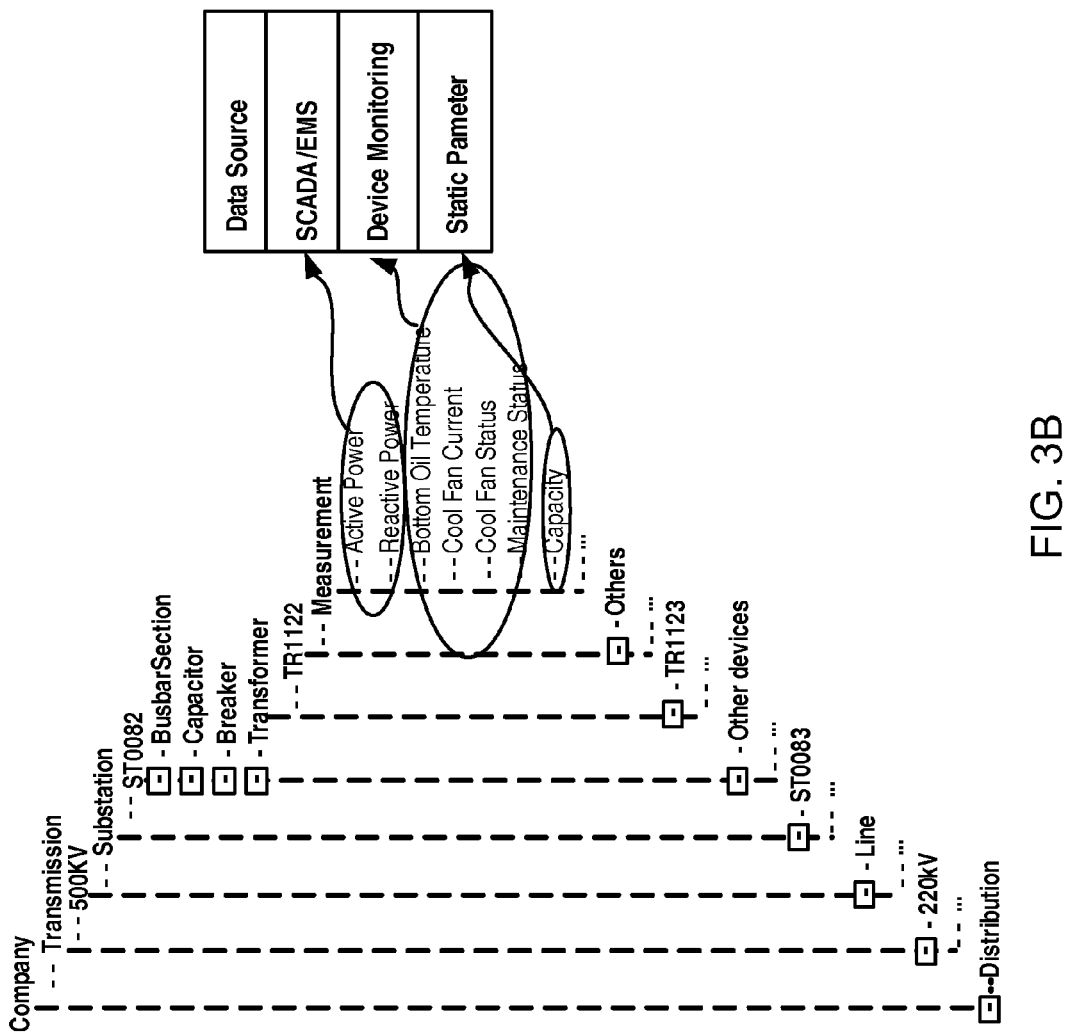
FIG. 3B schematically illustrates another diagram of a part of a data model according to an example embodiment of the present disclosure.

As illustrated in FIG. 3A, which schematically illustrates a diagram of a data model according to an example embodiment of the present disclosure, the data model covers various originations, for example various elements and objects in transmission network, distribution network and customer domains such that it can provide a uniform and centralized data view to various data in the power grid. Additionally, data from different data sources are managed and the attribute definitions of all data objects are unified. As illustrated in FIG. 3B, in the data model, data from various data sources for example SCADA/EMS, device monitoring and static parameters are covered, however, in a conventional solution, these data are distributed in different departments. Moreover, in such data model, it can use object oriented approach to manage all attributes of an object, which may provide an easy and convenient management on the data. Beside, in the data model, it may define more new attributes, such as "Bottom Oil Temperature" for a transformer as a measurement type. These attribute definitions can be used in various business units which would provide a unified data view for all applications. With such a data model, it can achieve a good scalability and applications can efficiently obtain information that they need.

Additionally, in the data model in the present disclosure, a global measurement management scheme may be adopted. For all applications, the global measurement management will provide a unique global ID (identifier) to each measurement point. The global ID is an identifier for identifying a measurement point, which is unique through the whole system, and using such a unique global ID, it can provide applications a quick and easy access to measurement points without learning specific database and specific storage positions of data.

Figure 3C:
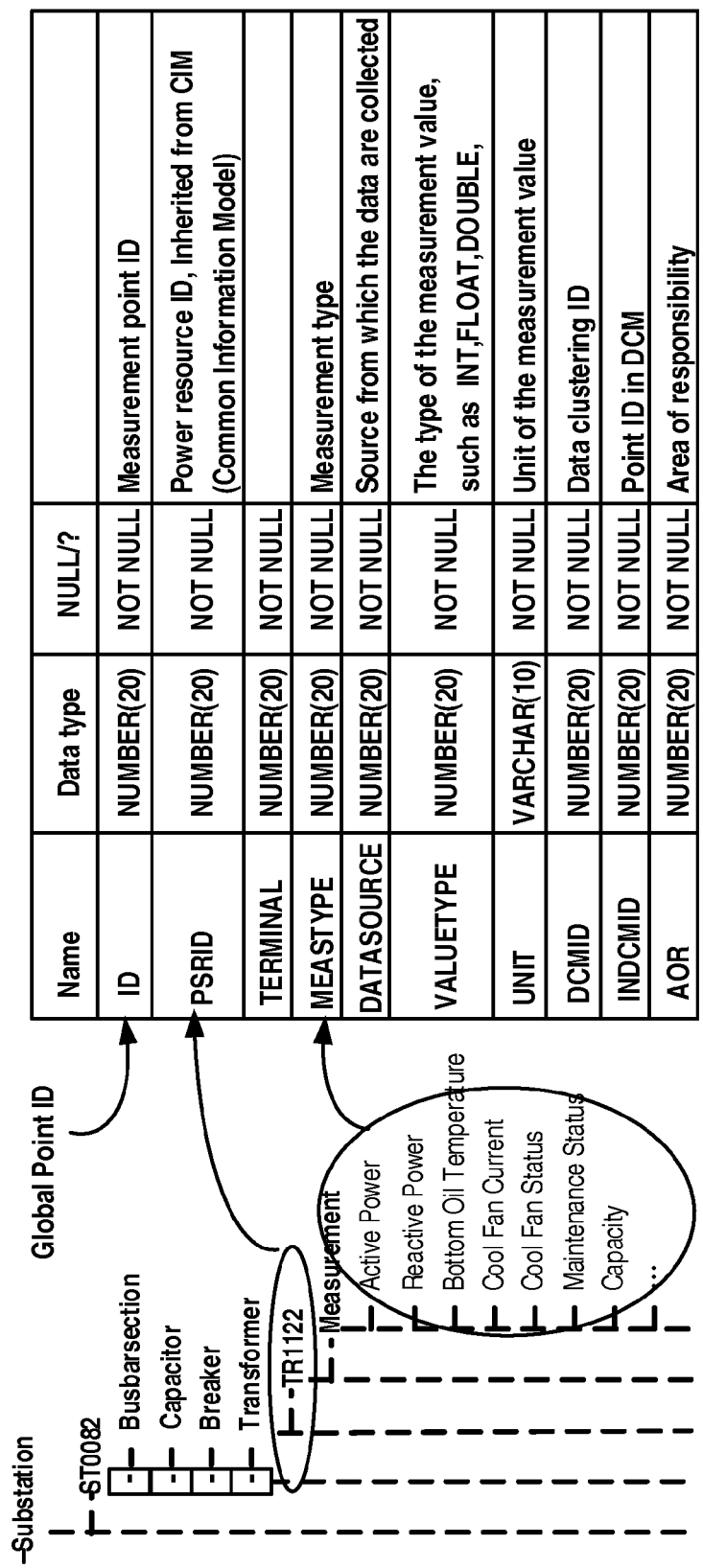
FIG. 3C schematically illustrates a global measurement point management according to an example embodiment of the present disclosure.

For a purpose of illustration, in FIG. 3C is illustrated an example design of the global measurement point management configuration, which comprises configuration information on measurement points based on a global management. As illustrated, the table may include: a unique global point identifier (ID), i.e., measurement point "ID"; "PSRID", i.e., ID of the power device with which the measurement point are associated, which can be inherited from CIM (Common Information Model); and measurement type "MEASTYPE", which denote type of the measurement. For example, the "MEASTYPE" can have a value of "P" representing active power, "Q" representing reactive power, "T" representing temperature, "I" representing current, and so on. Additionally, the data table may include "DATASOURCE", the source from which the data are collected; "Value Type", i.e., the type of measurement values; "UNIT"; i.e., the unit of the measurement value; and "AOR", which denotes a set of groups in which users are allowed to access the information related to the measurement point.

Particularly, as illustrated, the data table may further include a cluster ID ("DCMID") and in-cluster ID in DCM ("INDCMID") of a measurement point. The cluster ID may be also called as data clustering management ID, which is an identifier for identifying a data cluster to which the measurement point belongs. The in-cluster ID is an identifier for identifying a position of the measurement point in the data cluster.

From the table as illustrated in FIG. 3C, it can be seen that, the global data management can not only provide data queries based on the global measurement point ID but also provide data queries through PSRID and/or measurement type. Actually, the PSRID can be the unified number of the power resource in the electrical utility through which an enterprise-wide application can obtain all measurements related to a power source. By further specifying a certain measurement type, the enterprise-wide application can obtain a specific measurement related to the power source, which belongs to the measurement type.

Figure 3D:
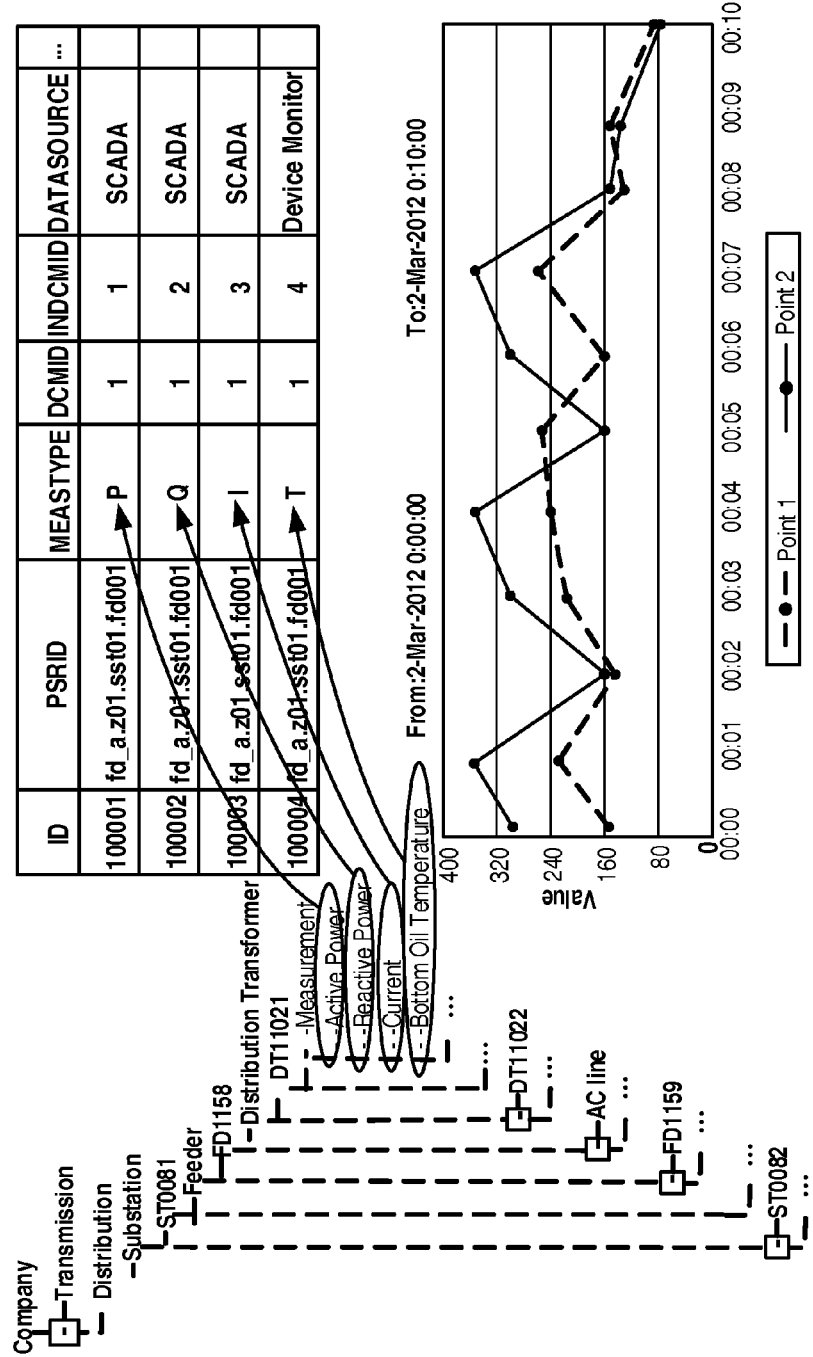
FIG. 3D schematically illustrates an example of data model application according to an example embodiment of the present disclosure.

For a purpose of illustration, FIG. 3D schematically illustrates an example of data model application. As illustrated, rows 1 to 4 in right top table respectively illustrate records on measurement points regarding active power, reactive power, current and bottom oil temperature. Taking the data for active power as an example, the record may include a measurement point global ID of "10001"; a PSRID of fd_a.z01.sst01.fd001; a measurement type of "P", a DCMID of "1", an INDCMID of "1", and a data source of "SCADA." Each application can use the global ID to fast locate a position of the data to quickly find the desired data. For example, by means of the global IDs "100001" and "100002", it can easily obtain values of measurement points 1 and 2 (illustrated in a bottom right diagram). Therefore, it will facilitate quick access of these data to use such a table, which will be described in detail hereinbelow.

With such a unified data model covering transmission network, distribution network and customer domains, it might greatly improve efficiency of building across-department enterprises-wide applications, and the use of the global IDs may also provide a quick and easy access to the high volume of data.

Data Clustering Management

In the current intelligence network, there are very large amounts of data and usually, two kinds of database technologies, i.e., real-time DB & relational DB, are used to handle the real-time data. However, both of them have great performance issues in dealing with rapidly increasing grid operational data. A real-time database has a limited capacity, but utility real-time data is usually increasing fast. By contrast, a relation database has performance bottlenecks of handling reading and writing of second level real-time data, specifically when accessing the history data. Moreover, the streaming data in the real-time system will quickly fill databases to their maximum capacity. Besides, as mentioned in the background, different types of data provide different data to different applications and should meet to different latency requirements. Therefore, utilities are facing a new challenge with storing and access of the high volume of data.

To this end, in the management system of the present disclosure, there is provided a data clustering management solution to efficiently manage the large amount of data.

Figure 4A:
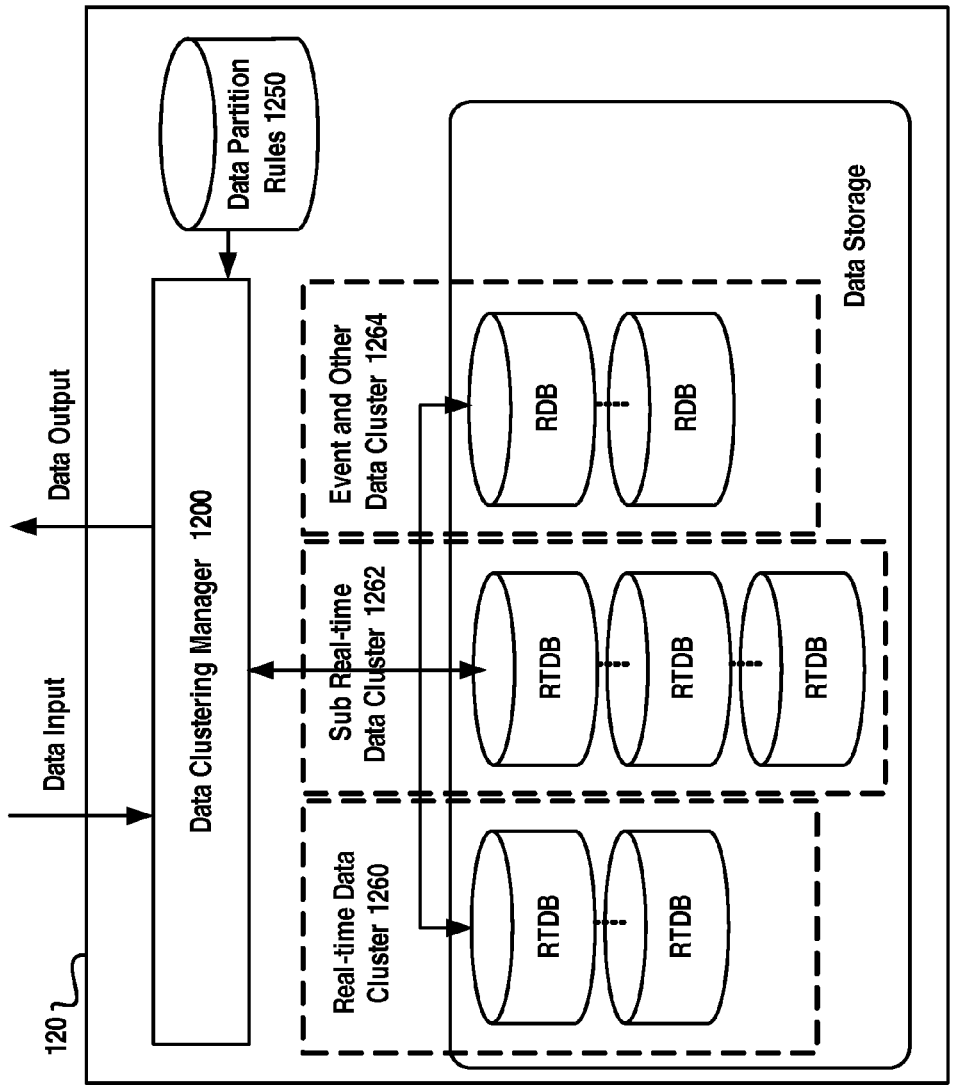
FIG. 4A schematically illustrates a diagram of data clustering principle according to an example embodiment of the present disclosure.

In the present disclosure, a data clustering approach is adopted based on which data will be clustered based on their characteristics. FIG. 4A schematically illustrates a diagram of data clustering principle according to an example embodiment of the present disclosure. As illustrated, the collected data are input to data clustering manager 1200. The data clustering manager 1200 will cluster data based on partition rules or data clustering rules stored in data partition rule module 1250. The data will be divided into different data clusters based on their characteristic so as to be stored in different types of databases. That is to say, different types of data are managed using different types of databases. As illustrated, the data can be divided into three data clusters, i.e., a real-time data cluster 1260, a sub real-time data cluster 1262, and events and other data cluster 1264. The data in the real-time data cluster 1260 can be stored in real-time databases (RTDB) dedicatedly for the real-time data cluster; the data in the sub real-time data cluster 1262 can be stored in real-time databases (RTDB) dedicatedly for the sub real-time data cluster; and the data in the event and other data cluster 1264 can be stored in relational databases (RDB) dedicatedly for that data cluster. For a purpose of illustration, an example of data clustering rule configuration is shown in the following table 1.

TABLE 1

An Example of Data Clustering Rule Configuration

| Cluster ID | DBID | Capacity | Current Point | Data Source |
|---|---|---|---|---|
| Real-time | 1 | 200,000 | 10,000 | PMU |
|  | 2 | 500,000 | 150,000 | SCADA/EMS |
|  | 3 | 500,000 | 1000 | Device Monitoring |
| Sub | 4 | 1,000,000 | 10,000 | AMI(0-1 million) |
| Real-time | 5 | 1,000,000 |  | AMI(1-2 million) |
| ... | ... | ... | ... | ... |
| Event and Others | 8 |  |  | AMI Event, Customer Events |
| ... | ... | ... | ... | ... |

From table 1, it can be seen that, data collected form PMU, SCADA/EMS, and Device Monitoring, which have a latency that ranges from milliseconds to seconds, may be divided into the real-time data cluster and stored in different real-time databases dedicatedly for the data cluster dependent on their data sources; data from AMI, which have a latency that ranges from minutes to hours, may be divided into the sub real-time data cluster to store in different real-time databases dedicatedly for the data cluster based on their data sources; and similarly AMI events and customer events (such as outage events, faulty events, alarms, etc.) or other types of data may be divided into the event and other data cluster to store in relational databases for that data cluster according to their data sources.

Different data might have different characteristics and different application purposes, and hence it is beneficial if data are clustered based on data partition rules or data clustering rules so as to manage these data using different technologies based on their characteristics. Additionally, the data clustering rules may be extensible, that is to say, it may be reconfigured as required. For example, with the increasing of data, it may add more databases for a data cluster, and it may also add new types of data cluster and even new types of databases to provide a more detailed data management. Therefore, such a data clustering scheme is very flexible, has a good scalability and may well adapt to the fast increase of data in power system.

For clustered data in the present disclosure, there is further presented a high speed and transparent data access scheme which will be detailed with reference to FIGS. 4B to 4F.

Figure 4B:
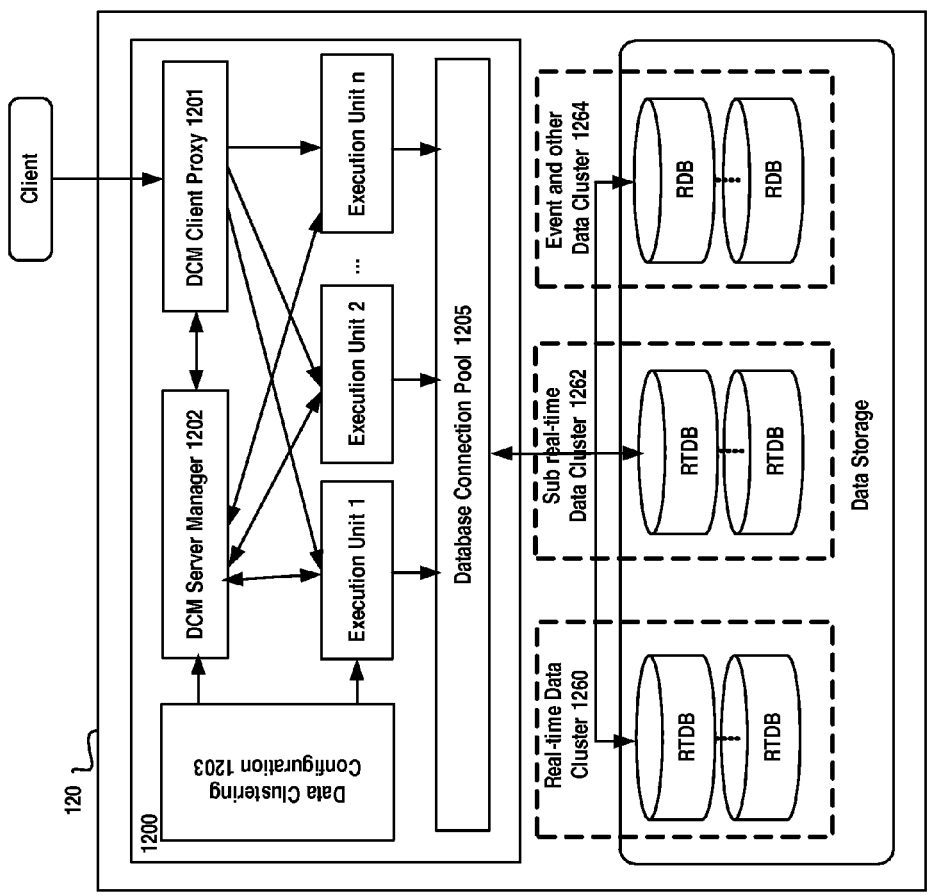
FIG. 4B schematically illustrates a diagram of an apparatus for accessing data in a power grid according to an example embodiment of the present disclosure.

FIG. 4B schematically illustrates a diagram of an apparatus for accessing data in a power grid according to an example embodiment of the present disclosure. As illustrated in FIG. 4B, the apparatus 1200 may include a DCM server manager 1202, a DCM execution unit. The DCM server manager 1202 may be responsible for dynamically manage execution unit for requests from the clients. It may create, based on a request for accessing data, an execution unit for the request and destroy the execution unit based on disclosure of the request. The execution unit, dynamically created for the request may be configured to access the data in the position of data based on the request and provide the result for the request. Once a request is closed or finished, a corresponding execution unit will be destroyed.

The apparatus can additionally comprise a cluster data configuration module 1203. The cluster data configuration module 1203 may be responsible for locating a position of the data requested by the client, for example, using a global identifier for a measurement point with which the data are associated, so as to provide a high speed access to the high volume of data. It can obtain data access parameters for the request using the global identifier for the measurement point and in-memory measurement point mapping indexes, and the data access parameters can be used by the execution unit to access the data directly. Particularly, a data cluster identifier and an in-cluster identifier of the measurement point may be first obtained from a global measurement point management configuration using the global identifier for the measurement point. Then, the cluster identifier and the in-cluster identifier may be used to find a database identifier of a database storing information on the measurement point and an in-database identifier of the measurement point in an in-memory data clustering management point configuration. The database identifier is an identifier for identifying the database in which the information on the measurement point is stored, and the in-database identifier is an identifier for identifying a position of the measurement point in the database. To connect to the database, the database link information, such as link handler, in a database connection pool can be found using the database identifier. In such a way, for either a real-time database or a relational database, the execution unit can quickly and easily obtain data by input the database link information and the in-database ID.

Alternatively, the apparatus can further comprise a DCM client proxy module 1201, which will uniformly handle requests from clients so as to provide a unified and transparent data services for all requests from clients. The proxy module 1201 may be configured to receive a request for accessing the data, register the request to the data clustering management server module and return the result for the request provided by the execution unit to clients. Also, an optional database connect pool management module may be provided, which may manage database connections for the different types of databases in a connection pool and dynamically adjust a number of the database connections based on access requirements from clients so as to provide a high speed access to the high volume.

In the following, a method for accessing data in a power grid will be described with reference to FIGS. 4C and 4F.

Figure 4C:
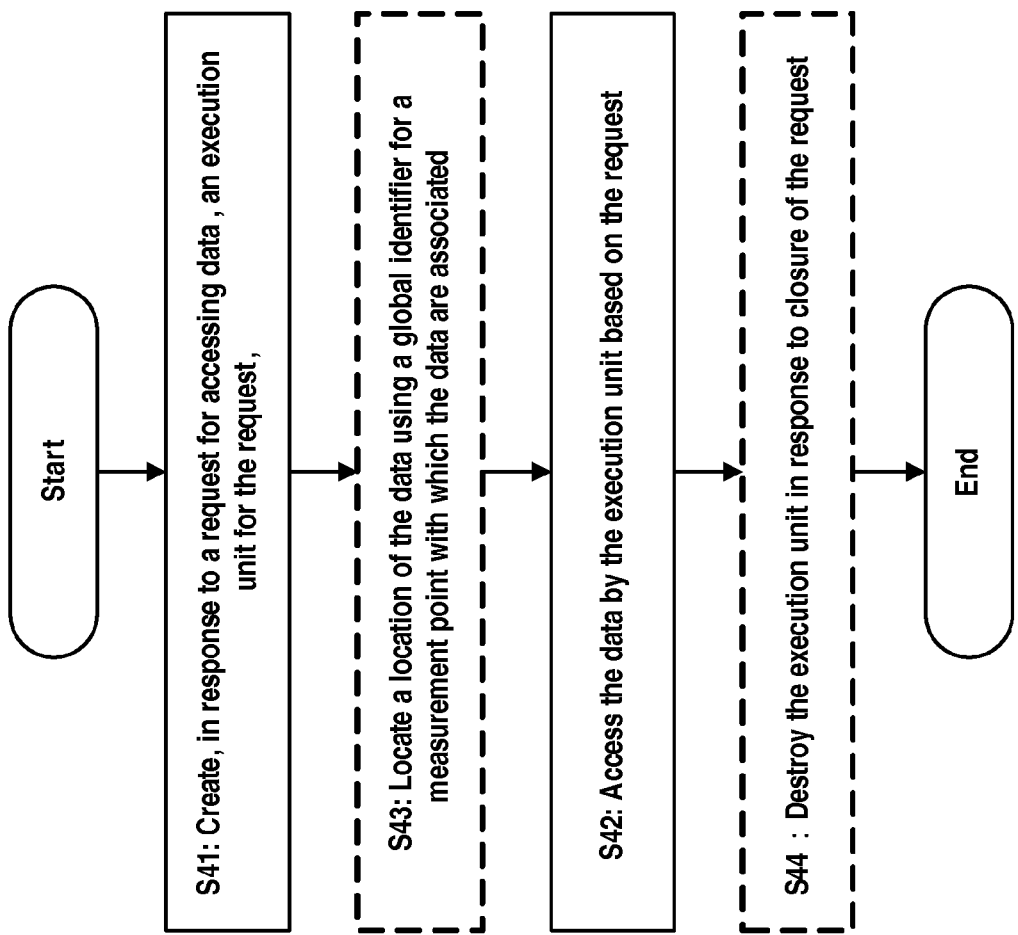
FIG. 4C schematically illustrates a flow chart of a method for accessing data in a power grid according to an example embodiment of the present disclosure.

First, at step S41 as illustrated in FIG. 4C, an execution unit is created for a request for accessing data to respond to the request form a client.

Figure 4D:
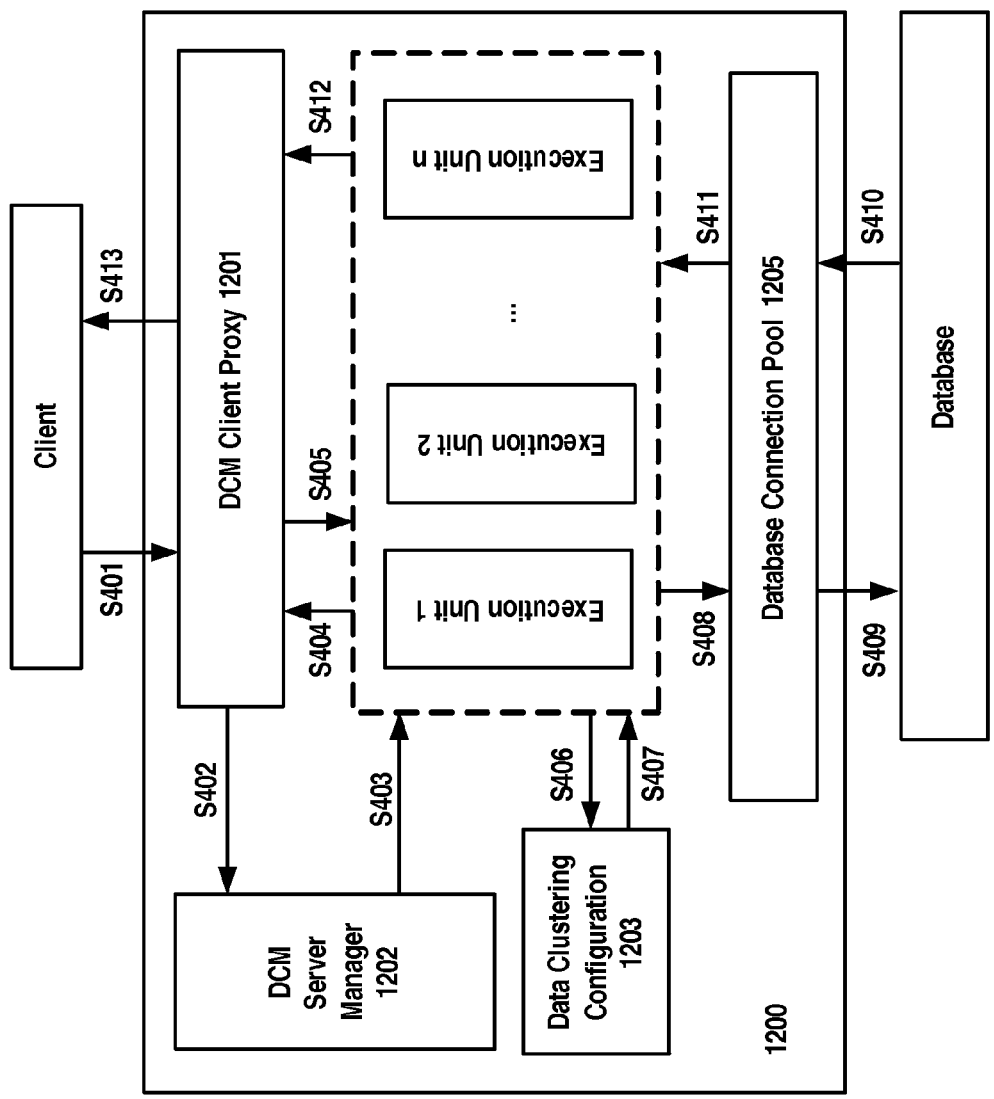
FIG. 4D schematically illustrates example operation steps of a accessing data in a power grid according to an example embodiment of the present disclosure.

If a client needs to access data, for example read and/or write data, it will send a request for accessing data to the DCM (S401 in FIG. 4D). The DCM proxy module 1201 receives the request, converts the request into a uniform internal format and then registers the request to the DCM server manager 1202 (S402 in FIG. 4D). Upon the request being registered to the DCM server manager 1202, the DCM server manager 1202 may create a new execution unit (a new instance for execution unit, also called as a server instance) for the request to respond the request (S403 in FIG. 4D).

Then, at step S42 illustrated in FIG. 4C, the created execution unit access the data based on the request.

The generated execute unit will provide a response to the DCM client proxy 1201 to inform the DCM client proxy that the DCM client proxy can communicate with the execution unit created for the request (S404 in FIG. 4D). The DCM client proxy 1201 transmits the request to the created execute unit (S405 in FIG. 4D). Based on the request, the execute unit will perform data access.

In the present disclosure, in the data model, it uses the global measurement point management scheme, and thus when the client requests a measurement point data, it will specify the PSRD of a power source with which the measurement point is associated and the measurement type. with these information, it may directly obtain from the data model the global measurement point ID (see FIGS. 3C and 3D), by which it can fast locate a position of the data. Therefore, in an embodiment of the present disclosure, at step S43, it can directly locate a position of the data using a global identifier for a measurement point with which the data are associated for using by the execution unit to access data. Particularly, after receiving the request from the DCM client proxy 1201, the DCM server manager 1202 ask the data clustering configuration module 1223 to provide data access parameters for the request; and meanwhile information on the global identifier for the measurement point, which may be contained in the request from the client, may be provided to the data clustering configuration module 1223 (S406 in FIG. 4D). To achieve a better data access performance, measurement point mapping indexes are built in memory. That is to say, an in-memory measurement point mapping indexes, for example in a form of measurement point configuration table, are built to maintain relationship between information on database ID and in-database ID associated with a measurement point and cluster ID and in-cluster ID of a measurement point in memory, and the measurement point mapping indexes may include further information about the measurement point, such as the type of value related to a measurement point. In this way, by using the in-memory measurement point mapping indexes and the global identifier and based on an optimization search approach, it will be easy and quick for the data clustering configuration module 1223 to find data access parameters.

Specifically, the data clustering configuration module 1203 first obtains a cluster ID "DCMID" of a data cluster to which the measurement point belongs and an in-cluster ID "INDCMID" of the measurement point, by look up a global measurement point management configuration (for example, the data table as illustrated in FIG. 3C or 3D) using the global identifier for the measurement point. Then, by means of the cluster ID "DCMID" and in-cluster ID "INDCMID", it may obtain a database ID of a database storing information on the measurement point and an in-database ID of the measurement point from in-memory data clustering management point configuration using the cluster identifier and the in-cluster identifier. The in-memory measurement point mapping indexes can be a DCM measurement point configuration table built in the memory and table 2 shows an example design of the DCM measurement point configuration table.

TABLE 2

Example DCM Measurement Point Configuration

| DCMID | INDCMID | name | DBID | INDBID | Value Type | ... |
|---|---|---|---|---|---|---|
| 1 | 1002 | Trans1_P | 1 | 22 | 1 | |
| 1 | 10005 | Trans2_I | 2 | 120 | 1 | |

From table 2, it is clear that it is easy to obtain database ID "DBID" and in-database ID "INDBID" by using the cluster ID "DCMID" and the in-cluster ID "INDCMID". After that, database link information in a database connection pool, such as the database link handler will be obtained using the database identifier. Table 3 shows an example DCM DB connection manager in which are stored the database link information.

TABLE 3

Example DCM DB Connection Manager

| DCMID | DBID | Link1 | Status | Link1 | Status | ... |
|---|---|---|---|---|---|---|
| 1 | 1 | Db1_link1 | Idle | Db1_link2 | idle | |

The data access parameters comprising database link information and the in-database ID are returned from the data clustering configuration module 1203 to the execution unit created for the request (S407 in FIG. 4D). To achieve a high speed data access, a dynamic array is designed to manage the measurement point position, such as DBID and INDBID. Information on those frequently used DBID and INDBID will be put into the dynamic array to expedite the data access.

Using database link information and the in-database ID, the execution unit will quickly and easily access data from either a real-time database or a relational database via a connection maintained by the database connection pool 1205 (S408 and S409 in FIG. 4D).

Figure 4E:
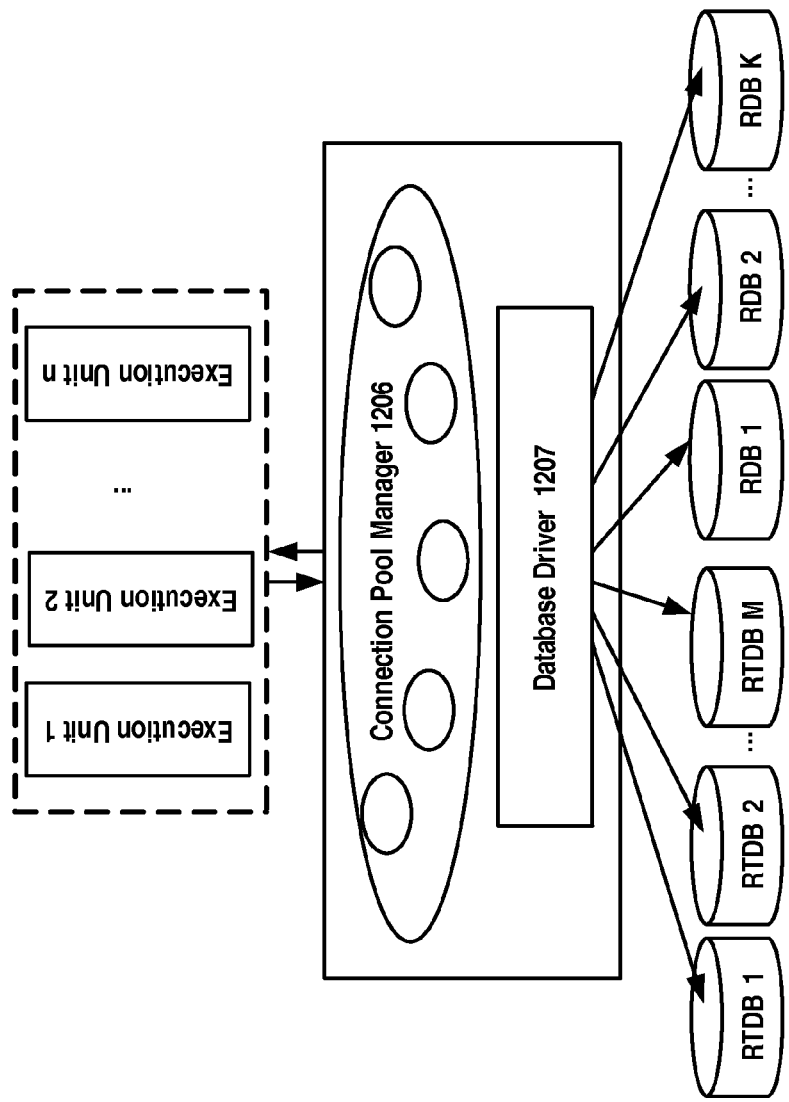
FIG. 4E schematically illustrates a diagram of connection pool management according to an example embodiment of the present disclosure according to an example embodiment of the present disclosure.

In the present disclosure, there is also employed a connection pool management scheme. As illustrated in FIG. 4E, a connection pool manager 1206 will maintain dynamic connections to each database and manage the database drives 1207 such as JDBC, ODBC or API etc. Particularly, the connection pool manger 1206 will establish the connections with each database, and increases/decreases connections dynamically based on clients' access requirements. Moreover, the connection pool manager 1206 may manage and maintain object status in connection pool, and connect, disconnect, and reconnect to the databases if necessary. For a purpose of illustration, DCM DB configurations Parameters are illustrated in table 4.

TABLE 4

Example DCM DB Configuration Parameter

| DCMID | DBID | Name | Driver | Parameters | Users | Current Points | Max Points | Type |
|---|---|---|---|---|---|---|---|---|
| 1 | 1 | P1Serv1 | SDK/API | 10.202.92.93:5450 | piadm | 100,000 | 200,000 | 1 |

Using this information, the execution unit can easily connect to a database and obtain the access required by the client. Results for data access will be provided to the execution unit corresponding to the request (S410 and S411 in FIG. 4D). After combination, the results will be provided to the DCM client proxy 1201 (S412 in FIG. 4D). The results may be converted into an appropriate format to send to the client as a response (S413 in FIG. 4D).

In operating, the DCM server manager 1202 will monitor and detect the clients' status, destroy the execute unit instance as soon as the client closes the request.

Therefore, in the present disclosure, an execution unit for accessing database will be created dynamically for each request from a client and closed once the request is finished.

Figure 4F:
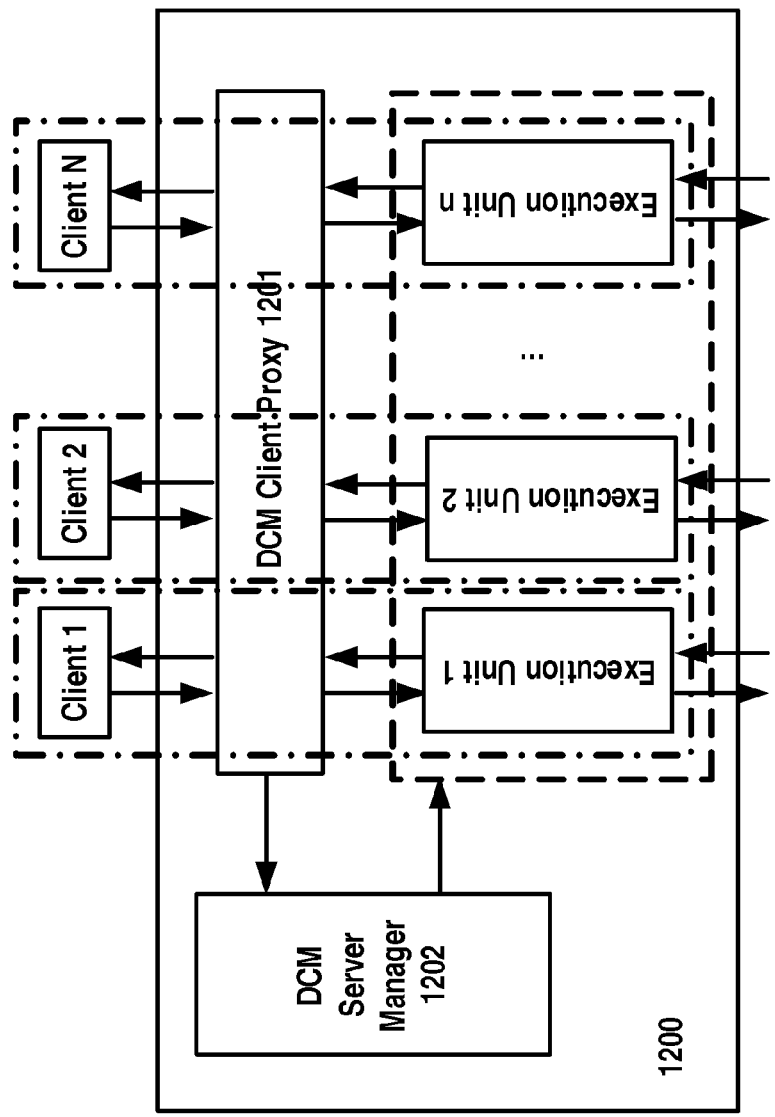
FIG. 4F schematically illustrates a diagram of execution unit creation according to an example embodiment of the present disclosure.

That is to say, in a case there are a great number of requests, there will be execution units corresponding to respective requests, as illustrated in FIG. 4F, and thus it can provide a high speed data access service to clients.

However, in another embodiment of the present invention, two or more execution units may be created for a single request, and in such a way, the data access speed may be further increased, which may bring more performance gains.

Additionally, it should be noted that the term "accessing" or "access" used herein may not only mean the writing and reading of data from clients, but also may mean any operations related to databases in data collecting, data processing, storing, etc.

Multi-Bus Collaboration and Performance Optimization

In the present disclosure, to handle the large number of data, there are presented optimization schemes to achieve the low latency of data transmitting. Particularly, it may use separate data writing flow, data access flow, and event data flow and at the same time provide a flexible, on demand multi-bus configuration for dynamically balancing bus loads.

Message Size Optimization

One of optimization schemes is to optimize message size to balance throughput and latency. It is found that a larger message size will achieve a higher throughput, which means that buffering real-time data for batch transmission might achieve a higher throughput. On the other hand, however, the real-time data must be delivered before its deadline (within the tolerable latency) and should not be buffered too long. Through a large number of tests, the following results on bus performance are obtained, which is given in Table 5.

TABLE 5

Mapping between Message Size and Throughput

| Message Size | 200 | 1k | 1.5k | 10k | 100k | 500k | 1M |
|---|---|---|---|---|---|---|---|
| Throughput | 1.8M | 7.5M | 9M | 30M | 58M | 54.5M | 34M |

From table 5, it can be seen that, with the increasing of message size, throughput become higher; however, the throughput will decrease when the message size reach a certain value (100K as shown).

Therefore, an optimal configuration scheme is designed which stipulates that a message size for data should be selected based on the mapping between message size and throughput such that a total delay of data meets a delay requirement. In other words, it should satisfy the following two conditions: (1) the selected message size should achieve a throughput larger than the throughput requirement; and (2) the total delay should be lower than the deadline for the real-time data to be sent. The two conditions can be represented by the following formulas:

$$M(T*r) > S, \text{ and}$$

$$T + e < d$$

wherein $M(\ )$ denotes a mapping between message size and throughput, for example, as shown in the table 4; $r$ denotes a real-time data generation speed (bytes/s); $d$ denotes the deadline for the real-time data to be sent; $T$ denotes a buffering delay; $e$ denotes a network delay; and $S$ denotes a throughput requirement.

With such an optimization configuration, the message size is optimized and the latency and the throughput can be well balanced.

Bus Load Balance

In the present disclosure, it uses a separate dedicated event bus to handle a high volume of events that may dramatically increase, so as to guarantee both performance and availability under the condition of event outburst which means the grid is in a contingency state. However, when the power grid is operating in normal state, there is no event to be transferred. Thus, the event bus is possible to be used to balance loads of the real time data bus. Besides, the service data bus or the operational bus may also be used for a similar purpose.

In the present disclosure, there is proposed an apparatus for delivering real-time data to dynamically allocate a small portion of real-time data traffic to real-time event bus and/or operational bus when they are not busy, and hence reduce the burden on real-time data bus. The apparatus 1310 for delivering the real-time data can be a part of the bus collaboration and optimization module 130 as illustrated in FIG. 2.

The apparatus 1310 may include a status monitor 1311, a balance engine 1312 and an agent 1313. The status monitor 1311 may be configured to monitor the current status of monitor traffic status of real-time buses, such as byte rate, pending message, etc. The real-time buses to be monitor may comprise at least a real-time data bus for delivering the real-time data and another real-time bus which can be the real-time event bus and/or the operational bus.

The balance engine 1312 is configured to assign, based on the traffic status of the real-time buses, the another real-time bus to deliver a portion of the real-time data to balance loads between the real-time buses. That is to say, if the real-time event bus or the operational bus assign is idle, it will assign the bus to carry part of the real-time data service.

The agent 1313 is configured to provide to a transparent operation to DCM and thus may be optional. The agent 1313 may handle bus assign request from DCM and send back a response.

Figure 5A:
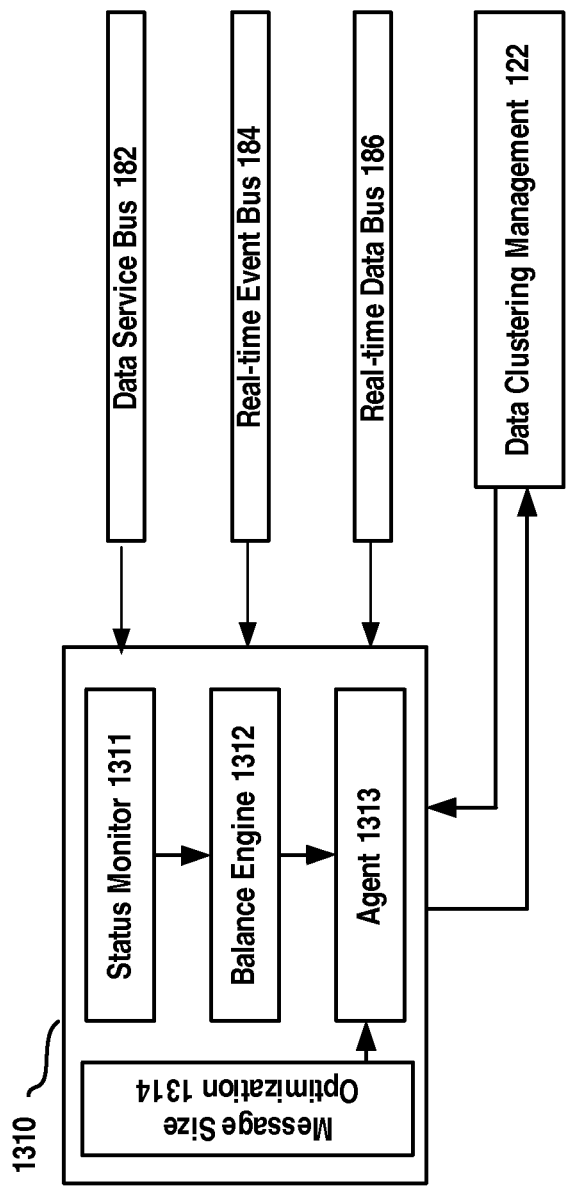
FIG. 5A schematically illustrates a block diagram of an apparatus for delivering real-time data in a power grid according to an example embodiment of the present disclosure.
Figure 5B:
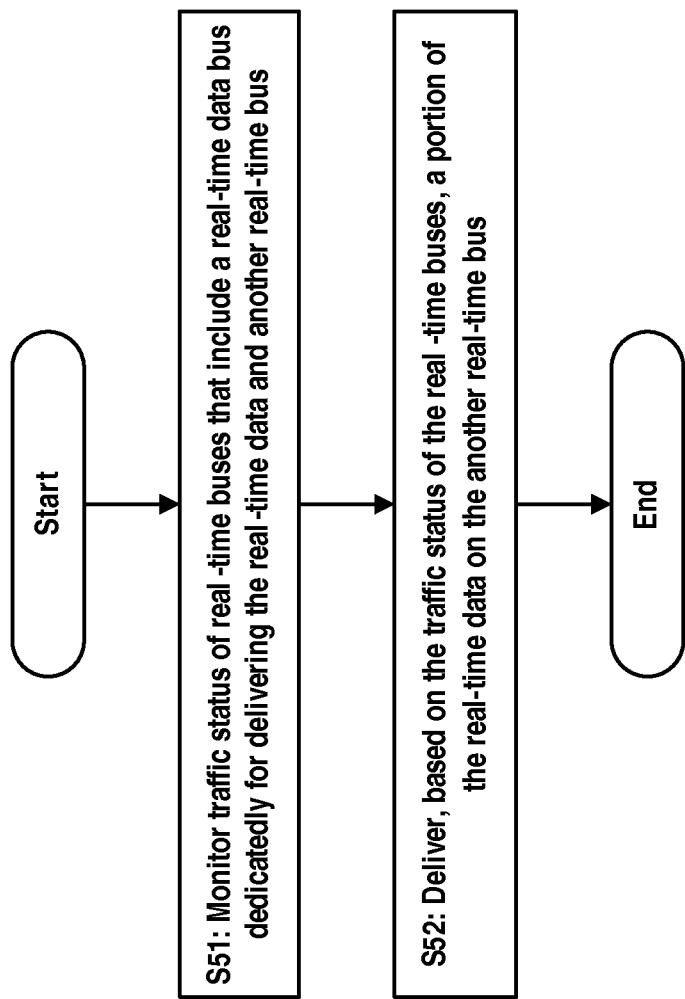
FIG. 5B schematically illustrates a flow chart of a method for delivering real-time data in a power grid according to an example embodiment of the present disclosure.

In delivering the real-time data, message size for data can be further optimized and hence in the present disclosure, the apparatus for delivering the real-time data can further comprise a message size optimization module 1314, configured to determine a message size for the real-time data based on a mapping between message size and throughput such that a total delay of the real-time data meets a delay requirement Besides, FIG. 5B also schematically illustrates a flow chart of a method for delivering real-time data in a power grid according to an example embodiment of the present disclosure. As illustrated, first at step S51, traffic status of real-time buses is monitored. As mentioned above, the monitored real-time buses may include a real-time data bus for delivering the real-time data and at least one another real-time bus and the another real-time bus can include the real-time event bus and/or the operational bus.

Based on the traffic status of the real-time buses, the real-time bus can be used to deliver a portion of the real-time data to balance loads between the real-time buses (Step D52).

In delivering the real-time data, a message size for the real-time data may be determined based on a mapping between message size and throughput such that a total delay of the real-time data may meet delay requirements. That is to say, the data may be buffer for a little while to achieve a better throughput performance.

In such a way, loads of real-time buses may be determined dynamically and optimally based on their respective traffic status such that the loads can be well balanced among these buses.

Data Delay Control

As mentioned hereinabove, the overall system of the present disclosure may be SOA-compatible. In such a case, a large number of service interactions that use interconnected infrastructure between various systems in an architecture can be enabled and added, and many point-to-point integrations may be created. However, these point-to-point integrations are difficult to maintain. Currently, originations are moving toward SOA architectures, which will host various deployed services and thus it is required to adopt an infrastructure service that could provide robust communication, intelligent routing, sophisticated translation and transformation of services. Therefore, a real-time data service bus such as Enterprise Message Service (EMS) bus may be utilized to provide common communication and integration services. Hereinafter, for a purpose of illustration, the EMS bus will be referenced to describe the embodiments of the present disclosure.

In conventional real-time data delivering process, it usually deploys one thread on the data consumer and one thread on the data producer. However, in the high-volume real-time data delivering, it is very likely to result in a mismatch between data consumption speed of the consumers on the EMS bus and the production speed of the data producer.

Figure 6A:
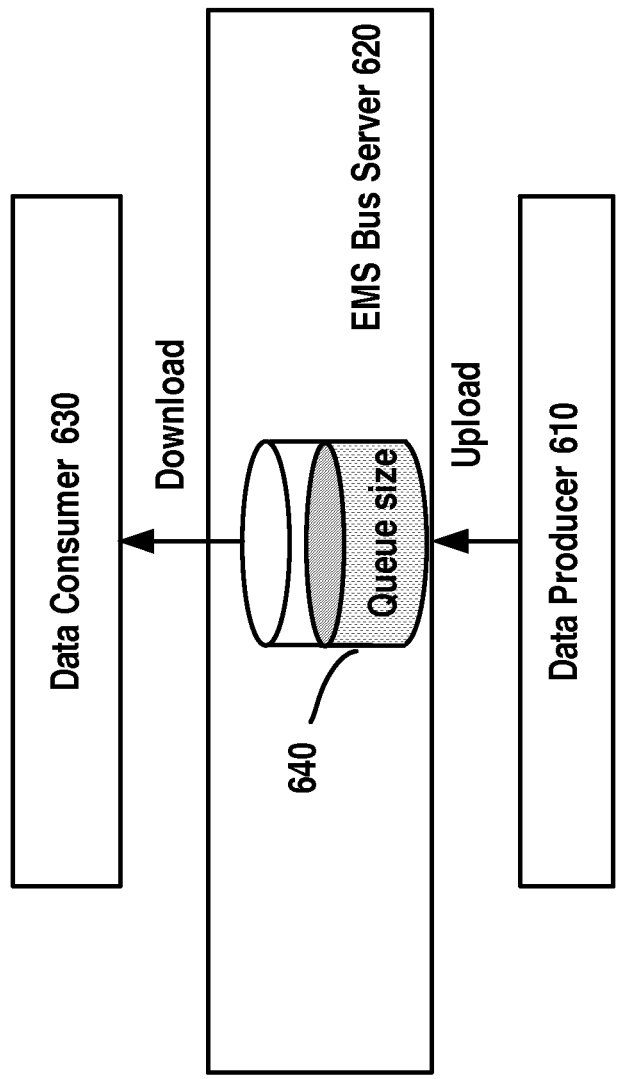
FIG. 6A schematically illustrates a mismatch between the data production and data consumption.

As shown in FIG. 6A, a data producer 610 generates the data in real time. The data producer 610 is a process capable of producing the real-time data, and it may be any data production process, which may include, for example, data collection, raw data preprocessing, data encoding, message encapsulation, data uploading etc. The generated data will be uploaded to an EMS bus server 620, which could provide robust communication and integration services. The EMS bus server 620 will maintain a buffer 640 to store the data uploaded by the data producer so as to buffer the generated real-time data. A data consumer 630 connects to the EMS bus server 620 and downloads the data therefrom for consumption. The data consumer 630 may be a process consuming data and it may be any data consumption process, which include, for example, data downloading, data decoding, data processing, etc. In the real-time data system, the data production and consumption processes must perform in a real-time manner. In other words, the latency from the data production to the data consumption must be sufficiently small to satisfy the QoS requirements. However, a speed at which the data producer generates the data is usually much faster than a speed at which that the data consumer consumes the data, and thus more and more data will accumulate in the buffer 640. This will bring a number of adverse effects. For example, the buffering delays are very likely to increase, which would cause the real-time data to be delivered beyond their deadlines. Moreover, in such a case, the real-time data buffered in bus server will quickly fill to its maximum capacity, that might result in EMS bus server crash due to the data overflow.

Therefore it is important to mitigate the above-mentioned problems. With this end in view, there is proposed in the present disclosure a solution to control delays of the real-time data delivered via a real-time service bus so as to maintain the balance between the data production speed and the data consumption speed.

Figure 6B:
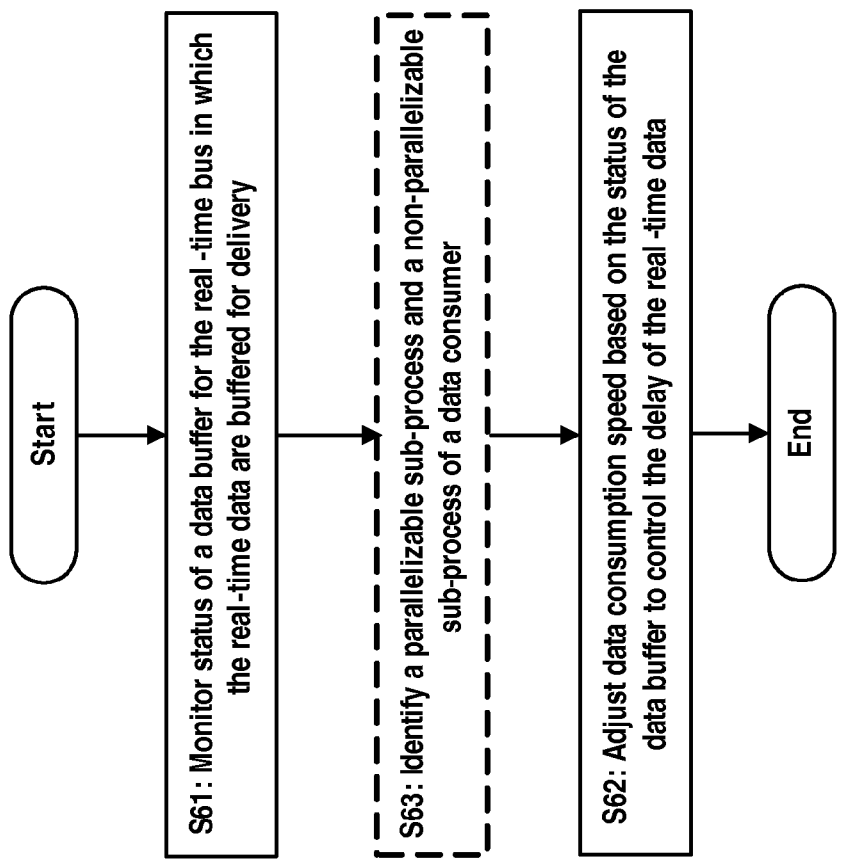
FIG. 6B schematically illustrates a flow chart of method for controlling a transmission delay of real-time data delivered via a real-time bus according to an example embodiment of the present disclosure.

Hereinafter, the method of controlling the delays of the real-time data will be described in detail. The main concept of the method is to control the consumption speed according to volume of data buffer in the bus server. Reference is made to FIG. 6B which schematically a method for controlling delays of real-time data delivered via a real-time service bus according to an embodiment of the present disclosure.

First, as step S61, the status of the buffer on the real-time service bus server is monitored so as to observe the current status of the buffer for buffering the real time data generated by the data producer. The current status of the buffer can be for example queue size of the data buffer. The queue size can be obtained by using APIs for the bus. For example, for TIBCO EMS bus, it can use a method to get the queue information in real-time, which is called getPendingMessageSize ( ).

Then at step S62, data consumption speed is adjusted based on the status of the data buffer to control the delay of the real-time data. The data consumption speed adjustment may be achieved for example by controlling a number of data consumption instances based on queue size of the data buffer. For example, it may increase the data consumption instances in response to an increase in the queue size such that more data consumption instances can consume the real-time data concurrently so as to increase the data consumption speed and reduce the data delay. On the other hand, as mentioned hereinabove, it may obtain a higher throughput to buffer data for batch transmission. Therefore, when the queue size is decreased, it may decrease the data consumption instances accordingly. In such a way, the queue size of the data buffer can be maintained in a proper range, that is to say, the data delay can be guaranteed and meanwhile it can achieve a better throughput performance.

Although increasing the data consumption instances may facilitate data consumption, it has been found that there is a limit value that may improve the data consumption speed. In other words, the data consumption speed will not increase any more with the increase in the number of the data consumption instances, if the number has reached the limit value. This is because data consumption process generally can be separated to two kinds, i.e., parallelizable sub-process and non-parallelizable sub-process. The parallelizable sub-process means a process that can be performed concurrently and it may include for example data downloading, data reading, message decoding, data mapping according to the predefined data model. The non-parallelizable process is a process that can only be executed serially and is forbidden to be executed by a plurality of consumption instance concurrently. An example for the non-parallelizable process is data writing operation on a database (because only one writing operation is allowed to perform on the database at one time). For a parallelizable process, increasing the number of the data consumer may increase the data consumption speed. However, increasing the number of the data consumer cannot increase the data consumption speed for a non-parallelizable process. In such a case, it is beneficial to maintain the number of the data consumption instances if it has reached a limit value beyond which the data consumption speed will not be improved.

Therefore, it may be beneficial to identify the non-parallelizable sub-processes and parallelizable sub-processes. In the present disclosure, the consumer program may be analyzed so that non-parallelizable sub-processes are distinguished from parallelizable sub-processes.

In an embodiment of the present disclosure, if data production speed is faster than non-parallelizable processing speed in the consumer, it will control data production speed because otherwise the system is unstable, i.e., the queue size will reach its capacity limit and the EMS server could crash due to data overflow. When the data production speed is faster than data consumption speed but slower than the non-parallelizable processing speed, it needs to adjust data consumption speed. In a case that the data production speed is slower than the data consumption speed, it means that one consumer thread is sufficient to consume all data produced in real-time.

The processing speed can be obtained by estimating of the processing time of the parallelizable sub-process and the non-parallelizable sub-process, respectively. In an embodiment of the present disclosure, the processing time of the parallelizable sub-processes and the processing time of the non-parallelizable sub-processes can be estimated as average process time of the parallelizable sub-processes and the non-parallelizable sub-processes respectively. Hereinafter, an example of average process time recording is provided for a purpose of illustration.

During running of the processes, the time instants t1(i), t2(i) and t3(i) can be recorded, wherein i denoted a time interval number; t1(i) denotes the time when the consumer thread starts to download message from the EMS bus server at ith time interval; t2(i) denotes the time when a non-parallelizable process starts at ith time interval; and t3(i) denotes the time when the non-parallelizable process returns at ith time interval.

Therefore, the processing time for the whole process at the ith time interval may be represented as $$T(i)=t1(i+1)-t1(i)$$

The processing time for the non-parallelizable sub-process at the ith time interval may be represented by $$T_{np}(i)=t_3(i)-t_2(i)$$

Therefore, the processing time for the parallelizable sub-process at ith time interval may be represented as $$T_p(i)=T(i)-T_{np}(i)$$

By obtaining time instants during a plurality of time intervals, it can obtain average of the process time of both parallelizable sub-processes and the non-parallelizable sub-processes. Therefore, the average the processing time, $T_{p\_avg}$ and $T_{np\_avg}$ can be represented as:

$$T_{p\_avg}=(T_p(1)+T_p(2)+\ldots+T_p(i)\ldots+T_p(N))/N$$

$$T_{np\_avg}=(T_{np}(1)+T_{np}(2)+\ldots+T_{np}(i)\ldots+T_{np}(N))/N$$

Additionally, it is advantageous to estimate the run-time processing time which can be updated over time, that is to say, updating the average of run-time processing constantly. In this case, the processing time of the parallelizable sub-processes and the processing time of the non-parallelizable sub-processes $T_{p\_avg}(i)$ and $T_{np\_avg}(i)$ may be represented as $$T_{p\_avg}(i)=(1-\alpha)T_{p\_avg}(i-1)+\alpha T_p(i)$$

$$T_{np\_avg}(i)=(1-\beta)T_{np\_avg}(i-1)+\beta T_{np}(i)$$

wherein each of parameters $\alpha$ and $\beta$ is a small constant which determines the degree to which the processing time in current time interval will affect the overall average time. The parameters $\alpha$ and $\beta$ may have a similar value, for example 0.02. However, another value is possible and it is also feasible to assume different values for parameters $\alpha$ and $\beta$.

In this way, it can learn the average processing time of parallelizable and non-parallelizable parts of a consumer process, which may be used to calculate how many consumer threads are needed to achieve the optimal message consumption speed.

Particularly, if a parallelizable processing speed is higher than a non-parallelizable processing speed, i.e., $1/T_{p\_avg}>1/T_{np\_avg}$, it may create two consumption threads. In this case, more consumption threads might not help to increase the overall data consumption speed. If the parallelizable processing speed is lower than the non-parallelizable processing speed, i.e., $1/T_{p\_avg}<1/T_{np\_avg}$, the number of the data consumption instances may be at most M (the limit value), wherein $$M = \left\lceil \frac{T_{p\_avg}(i)}{T_{np\_avg}(i)} \right\rceil + 1, \text{ and } \left\lceil \frac{T_{p\_avg}(i)}{T_{np\_avg}(i)} \right\rceil$$

means the smallest integer that is larger than $$\frac{T_{p\_avg}(i)}{T_{np\_avg}(i)}.$$

As an example, if $$\frac{T_{p\_avg}(i)}{T_{np\_avg}(i)} = 3.5,$$

then the limit value M can be determined as 5.

Figure 6C:
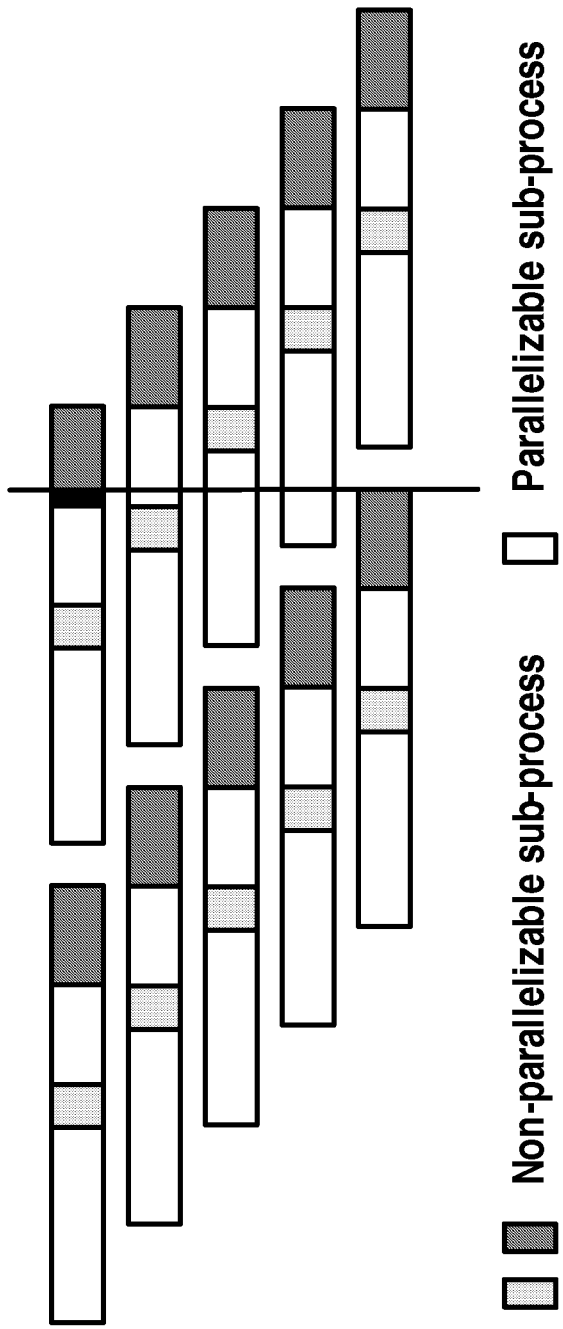
FIG. 6C schematically illustrates an example consumer process comprising parallelizable and non-parallelizable sub-processes.

Generally, there might be several non-parallelizable sub-processes that fragment the consumer process. In this case, it can only consider the longest non-parallelizable sub-process and other non-parallelizable sub-processes may be regarded as "parallelizable". As illustrated in FIG. 6C, a consumer thread includes two different non-parallelizable sub-processes, one being denoted by a block filled with oblique lines and the other being illustrated by a block filled with dots. In the figure, it is shown the possible optimal way to exploit an opportunity of parallelization. The black block has shown that no process is being executed in the data consumption instance at that time because the non-parallelizable sub-process denoted by a block filled with oblique lines must be executed serially. Therefore, it is clear that the extent to which the consumption threads can improve the consumption speed is determined by the longest non-parallelizable sub-process (i.e., the sub-process denoted by a block filled with oblique lines) and the shorter one (i.e., illustrated by the block filled with dots) have no any impact on the overall consumption speed. Additionally, it can also be seen that five threads have been able to achieve the maximum speed, and more threads will not help to improve the performance.

Figure 6D:
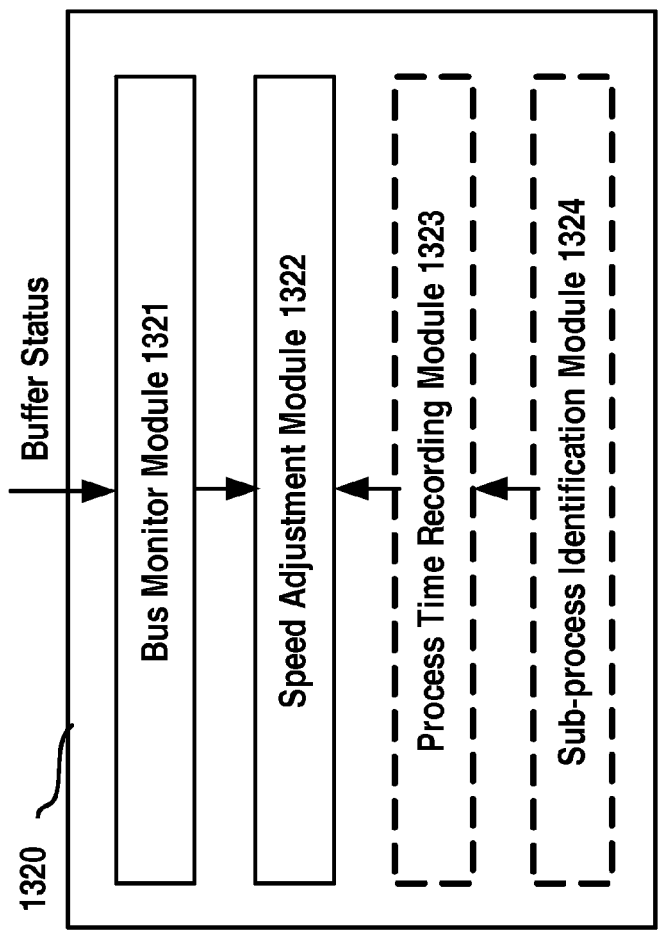
FIG. 6D schematically illustrates a block diagram of an apparatus for controlling a transmission delay of real-time data delivered via a real-time bus according to an example embodiment of the present disclosure.

FIG. 6D schematically illustrates a block diagram of an apparatus for controlling a transmission delay of real-time data delivered via a real-time bus according to an example embodiment of the present disclosure. The apparatus 1320 can be a part of the bus collaboration and optimization module 130 as illustrated in FIG. 2.

The apparatus 1320 may comprise a bus monitor module 1321 and a speed adjustment module 1322. The bus monitor module 1321 may be configured to monitor status of a data buffer for the real-time bus in which the real-time data are buffered for delivery. The speed adjustment module 1322 may be configured to adjust data consumption speed based on the status of the data buffer to control the delay of the real-time data.

Additionally, the apparatus 1320 may further comprise a sub-process identification module 1323 and a process time recording module 1324. The sub-process identification module 1323 may be configured to identify a parallelizable sub-process and a non-parallelizable sub-process of a data consumer. The process time recording module 1324 may be configured to obtain runtime average process time of the parallelizable sub-process and runtime average process time of the non-parallelizable sub-process. The speed adjustment module is configured to control a number of the data consumption instances based on the runtime average process time of the parallelizable sub-process and the runtime average process time of the non-parallelizable sub-process.

In an example detailed implementation of the present disclosure, the speed adjustment module 1322 may initially first create n consumption threads (i.e., data consumption instances), where n can be a predetermined number and is less than M. These n consumption threads will download and process data independently. The non-parallelizable sub-process must be executed in series, which can be achieved by synchronization mechanism. The bus monitor 1321 probes the size of queue in EMS bus every one second, and keeps the track of the queue size over the time. The record about the queue size may be recorded as $\{q1, q2, \ldots, qt, qt+1, \ldots\}$. The number of contiguous increase of queue size may also be counted as c. When the counter exceeds a threshold (denoted by H), the speed adjustment module 1322 can determine to create a new consumption thread.

The counter c may be updated by the following algorithm:

$$c=c+1; \text{ if } q_t > q_{(t-1)}$$

$$c=0; \text{ if } qt < q_{(t-1)}; \text{ or } c=H$$

Moreover, if the q>65% storage capacity, the speed adjustment module 1322 may create a new thread regardless the value of the counter. If the number of consumption threads is larger than M, no consumer thread will be created.

Additionally, if a consumption thread stays idle for a long time and the number of total threads is larger than M, the manager will destroy the thread. This operation will continue until the number of total consumption threads is equal to M.

Event Integration and Complex Event Process

In the present disclosure, there is also provided an event integration and complex event process apparatus. In the present disclosure, a real time event integration and management component are designed and new domain models based on CEP technology are designed to mine the correlated events from different data sources. Therefore, the possible risk may be identified promptly and in turn utility enterprise business operation may be improved.

As illustrated in FIG. 6A, the event integration and complex event process apparatus 140 may comprise event manager 1410, event processor 1420, and grid model 1430.

The event manager 1410 is configured to integrate all events and provide publish/subscribe event service to applications. Various applications such as operations applications 310, maintenance applications 320, customer service application 330, etc., may subscribe to events that they concerns at the event manager. When the event manager 1410 receives events from various data source transmitted over the real-time event bus, it will integrate events related to each objects (such meter, transformer, etc.), and publish corresponding events to respective application based on their subscriptions.

The event processor 1420 is configured to define, capture various events and correlate the events using pre-designed analytical models, real-time network topology and real-time service data. The event processor 1420 may comprise a CEP (Complex Event Process) engine 1422, a network topology module 1424, analytical model module 1426 and a check data obtainment module 1428. When the CEP engine 1422 receives events from various data source transmitted over the real-time event bus, it will analysis the events based on domain models stored in the analytical model module 1426, network topology stored in the network topology module 1424 and make a confirmation based on the data obtained by the check data obtainment module 1428. The network topology module 1424 stores dynamic connection relationship among objects in the power grid, which are obtained in real time based on the real-time data in the power grid and grid model (which indicates static connection relationship among objects in the power grid) stored the grid model module 1430. Process result of events may be a prediction event that reports, for example, a faulty of feeder segment. The process result may be provided by the CEP engine 1422 to the event manager 1410 which in turn will publish the event to corresponding applications.

Figure 7A:
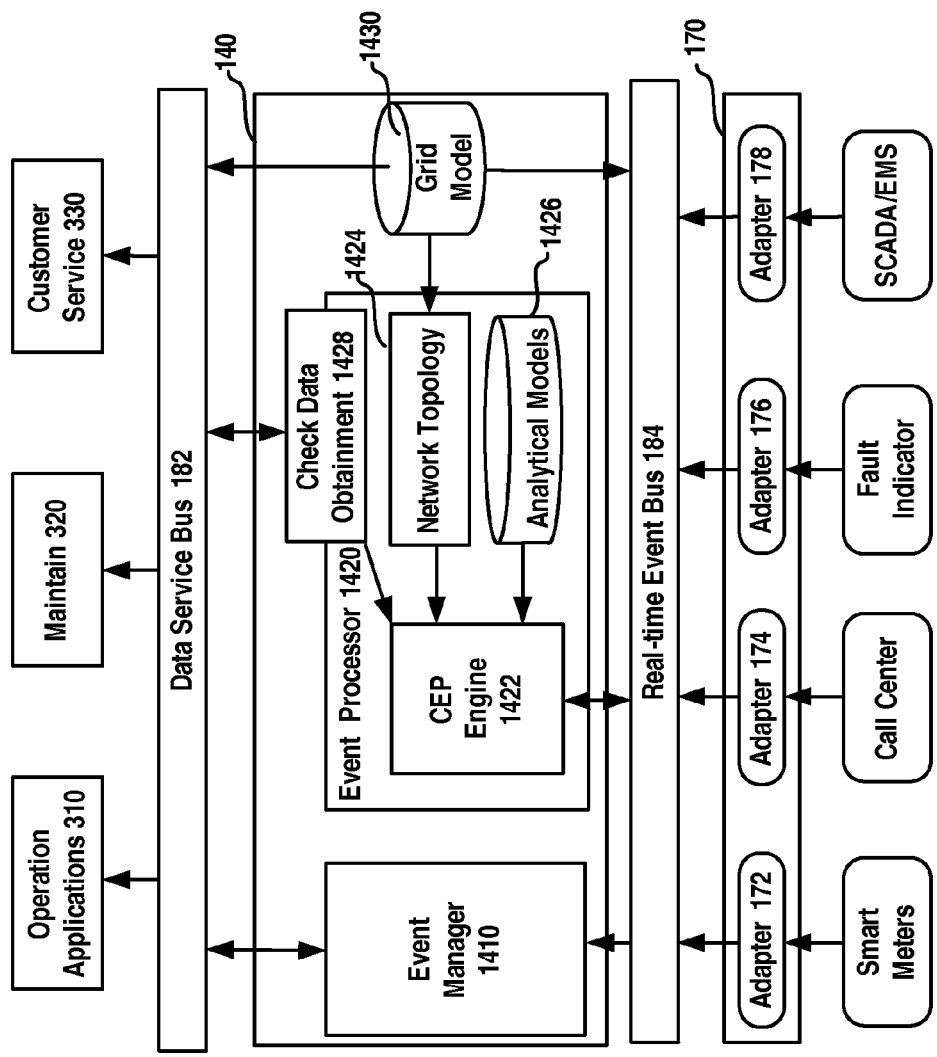
FIG. 7A schematically illustrates a diagram of an apparatus for event integration and complex event process according to an example embodiment of the present disclosure.
Figure 7B:
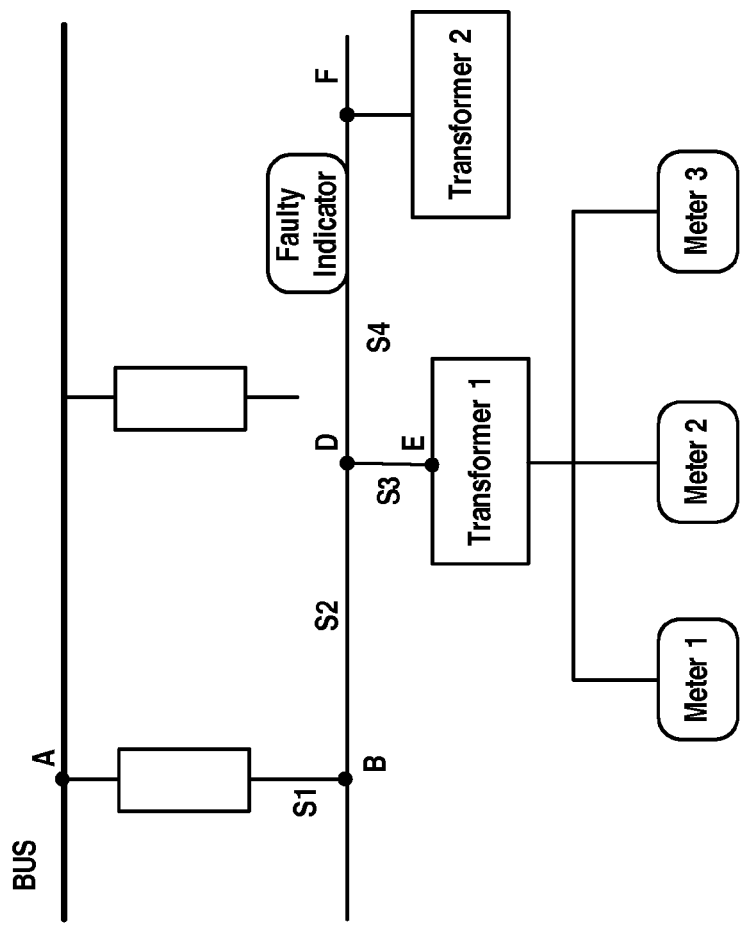
FIG. 7B schematically illustrates a diagram of an example of domain models according to an example embodiment of the present disclosure.

An example of complex event process according to the present disclosure will be described hereinafter with reference to FIG. 7B which schematically illustrates a diagram of an example of domain models according to an example embodiment of the present disclosure;

Firstly, if the CEP engine 1422 receives a report about a meter fault event from meter 1, it can determine that the meter 1 is fault. Then events associated with the fault event will be obtained, for example those from other meters (meters 2 and 3) which belong to a same distribution transformer as meter 1, i.e., supplied by a same distribution transformer as meter 1. If the CEP engine 1422 finds from those associated events that there are more than 50% meters are fault, it may infer that the transformer 1 is suspended. Then CEP engine 1410 may perform a check, it will use real time data of the transformer 1 (such as active power, voltage etc.), which is obtained by the check data obtained module 1430 over data service bus, to get a confirmation. If the CEP engine 1422 determines the transformer 1 is suspended, then it will further search associated events. In a case that it finds that the distribution transformer 1 and feeder segment (i.e., S4) is also fault, it can infer based on the network topology that the upstream feeder segment (S2) might be fault and further check can be made through reviewing their real time data such as active power, voltage, etc. In such a way, finally, the root cause of power outage and outage scope can be identified rapidly.

With the architecture of the present disclosure, it is capable of managing the data with different latency requirements and from different data sources, efficiently may manage high volumes of time-series real-time data; efficiently manage high volumes of event outburst. It may also manage the data based on the unified data model and provide a single version of the data set to all the applications. Furthermore, it may provide a complex event process capability to capture complex relationships among the events generated by the devices, network and electricity customers such that the potential risk in electric utility enterprise business operations can be identified.

Furthermore, there is provided a tangible computer-readable medium having a plurality of instructions executable by a processor to access data in a power grid, the tangible computer-readable medium comprises instructions configured to perform steps of the method according to any embodiments of method for accessing data in a power grid as presented in the present disclosure.

Furthermore, there is provided another tangible computer-readable medium having a plurality of instructions executable by a processor to control a transmission delay of real-time data delivered via a real-time bus, the tangible computer-readable medium comprises instructions configured to perform steps of the method according to any embodiments of method for controlling a transmission delay of real-time data delivered via a real-time bus as presented the present disclosure.

Furthermore, there is provided a further tangible computer-readable medium having a plurality of instructions executable by a processor to deliver real-time data in a power grid, the tangible computer-readable medium comprises instructions configured to perform steps of the method according to any embodiments of method for delivering real-time data in a power grid as presented the present disclosure.

Besides, it should be noted that operations of respective modules as comprised in systems, apparatuses substantially correspond to respective method steps as described in details. Therefore, for detailed operations of respective modules, reference may be made to related descriptions of the methods as made in the present disclosure.

Additionally, FIG. 8 schematically illustrates a general computer system 800, which may represent any of the computing devices referenced herein. For instance, the general computer system 800 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 800 may include an ordered listing of a set of instructions 802 that may be executed to cause the computer system 800 to perform any one or more of the methods or computer-based functions disclosed herein. The computer system 800 may operate as a standalone device or may be connected, e.g., using the network 820, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the network 820 through any form of browser. Further, each of the systems described may include any collection of sub-systems that individually or jointly execute a set, or multiple sets, of instructions to perform one or more computer functions.

The computer system 800 may include a processor 807, such as a central processing unit (CPU) and/or a graphics processing unit (GPU). The processor 807 may include one or more general processors, digital signal processors, application specific integrated circuits, field programmable gate arrays, digital circuits, optical circuits, analog circuits, combinations thereof, or other now known or later-developed devices for analyzing and processing data. The processor 807 may implement the set of instructions 802 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 800 may include a memory 805 on a bus 820 for communicating information. Code operable to cause the computer system to perform any of the acts or operations described herein may be stored in the memory 805. The memory 805 may be a random-access memory, read-only memory, programmable memory, hard disk drive or any other type of volatile or non-volatile memory or storage device.

The computer system 800 may also include a disk, solid-state drive optical drive unit 815. The disk drive unit 815 may include a non-transitory or tangible computer-readable medium 840 in which one or more sets of instructions 802, e.g., software, can be embedded. Further, the instructions 802 may perform one or more of the operations as described herein. The instructions 802 may reside completely, or at least partially, within the memory 805 and/or within the processor 807 during execution by the computer system 800. The database or any other databases described above may be stored in the memory 805 and/or the disk unit 815.

The memory 805 and the processor 807 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 800 may include an input device 825, such as a keyboard or mouse, configured for a user to interact with any of the components of system 800, including user selections or menu entries of display menus. It may further include a display 830, such as a liquid crystal display (LCD), a cathode ray tube (CRT), or any other display suitable for conveying information. The display 830 may act as an interface for the user to see the functioning of the processor 807, or specifically as an interface with the software stored in the memory 805 or the drive unit 815.

The computer system 800 may include a communication interface 836 that enables communications via the communications network 820. The network 820 may include wired networks, wireless networks, or combinations thereof. The communication interface 836 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 807. Software modules may include instructions stored in the memory 805, or other memory device, that are executable by the processor 807 or other processors. Hardware modules may include various devices, components, circuits, gates, circuit boards, and the like that are executable, directed, and/or controlled for performance by the processor 807.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:

1. A system for accessing data in a power grid, comprising:
    a processor; and
    a memory storing non-transitory computer executable instructions;
    wherein the computer executable instructions are executable with the processor to cause the system to:
    create, based on a request for accessing power grid data, an execution unit for the request, wherein power grid data are divided, based on their characteristics, into a plurality of data clusters and stored in different types of databases and wherein the power grid data comprises parameters related to equipment in the power grid for at least one of electric power generation, electric power transmission, or electric power distribution,
    locate a database storage position of the power grid data using a unique global identifier of a corresponding measurement point with which the power grid data are associated, and
    access the power grid data by the execution unit based on the request.

2. The system according to claim 1, wherein the computer executable instructions executable with the processor to cause the system to: locate the database storage position of the power grid data comprises: computer executable instructions executable with the processor to cause the system to:
    obtain a plurality of data access parameters for the request using the unique global identifier for the measurement point and in-memory measurement point mapping indexes; and
    wherein the computer executable instructions executable with the processor to cause the system to: access the power grid data comprises computer executable instructions executable with the processor to cause the system to:
    access the power grid data based on the data access parameters.

3. The system according to claim 2, wherein the computer executable instructions executable with the processor to cause the system to: obtain the plurality of data access parameters for the request comprises: computer executable instructions executable with the processor to cause the system to:
    obtain a cluster identifier of a data cluster to which the measurement point belongs and an in-cluster identifier of the measurement point from a global measurement point management configuration using the global identifier for the measurement point;
    obtain a database identifier of a database storing information on the measurement point and an in-database identifier of the measurement point from an in-memory data clustering management point configuration using the cluster identifier and the in-cluster identifier;
    obtain database link information in a database connection pool using the database identifier; and
    wherein the data access parameters comprise the database link information and the in-database identifier providing the database storage location of the power grid data.

4. The system according to the claim 1, wherein the computer executable instructions executable with the processor further comprise computer executable instructions executable with the processor to further cause the system to: destroy the execution unit based on closure of the request.

5. The system according to claim 1, wherein database connections for the different types of databases are managed in a connection pool and wherein the computer executable instructions executable with the processor further comprise computer executable instructions executable with the processor to cause the system to adjust a number of the database connections based on access requirements from clients.

6. The system according to claim 1, wherein the request is received by a client proxy to provide a unified service for all requests from clients.

7. The system according to claim 1, wherein the computer executable instructions executable with the processor further comprise computer executable instructions executable with the processor to further cause the system to: create a new data cluster and/or a new database based on an increase of power grid data.

8. A method for accessing data in a power grid, comprising:
- creating with a data access apparatus, based on a request for accessing power grid data, an execution unit for the request, wherein power grid data are divided, based on their characteristics, into a plurality of data clusters and stored in different types of databases and wherein the power grid data comprises parameters related to equipment in the power grid for at least one of electric power generation, electric power transmission, or electric power distribution;
- locating, by the data access apparatus, a database storage position of the power grid data using a global identifier for a measurement point with which the power grid data are associated; and
- accessing, by the data access apparatus, the power grid data using the execution unit based on the request.

9. The method according to claim 8, wherein the locating, by the data access apparatus, the position of the power grid data comprises:
- obtaining, by the data access apparatus, a plurality of data access parameters for the request using the global identifier for the measurement point and in-memory measurement point mapping indexes; and
- wherein the accessing is performed by the data access apparatus based on the data access parameters.

10. The method according to claim 9, wherein the obtaining, by the data access apparatus, the plurality of data access parameters for the request comprises:
- obtaining, by the data access apparatus, a cluster identifier of a data cluster to which the measurement point belongs and an in-cluster identifier of the measurement point from a global measurement point management configuration using the global identifier for the measurement point;
- obtaining, by the data access apparatus, a database identifier of a database storing information on the measurement point and an in-database identifier of the measurement point from an in-memory data clustering management point configuration using the cluster identifier and the in-cluster identifier; and
- obtaining, by the data access apparatus, database link information in a database connection pool using the database identifier; and
- wherein the data access parameters comprise the database link information and the in-database identifier providing the database storage location of the power grid data.

11. The method according to claim 8, further comprising: destroying the execution unit, by the data access apparatus, based on disclosure of the request.

12. The method according to claim 8, further comprising managing, by the data access apparatus, database connections for the different types of databases in a connection pool and adjusting, by the data access apparatus, a number of the database connections based on access requirements from clients.

13. The method according to claim 8, wherein the request is received by a client proxy to provide a unified service for all requests from clients.

14. The method according to claim 8, further comprising creating, by the data access apparatus, a new data cluster and/or a new database based on an increase of data.

15. A system for accessing data in a power grid, comprising:
- a data clustering management (DCM) server configured to receive, in real-time, power grid data on a data service bus, and receive a request for access to measurement point data from a client outside the system, wherein the measurement point data is indicative of electrical data of a particular power device included in the power grid, and the request comprises a unique identifier of the particular power device and a measurement type;
- a data cluster manager executable by the DCM server to divide the received real-time power data into one of a plurality of data clusters based on characteristics of the received real-time power data;
- a DCM proxy module executed by the DCM server to register the request received from the client with a DCM server manager executed by the DCM server;
- the DCM server manager further executed by the DCM server to generate an execution unit to respond to the request received and request data access parameters for the measurement point data requested;
- the execution unit executed by the DCM server to identify a location in one of the data clusters where the measurement point data is located based on the data access parameters received by the DCM server manager; and
- the execution unit further executed by the DCM server to access the measurement point data at the identified location.

16. The system of claim 15, wherein the data access parameters comprise a cluster identifier of the one of the data clusters, and an in-cluster identifier of a location within the one of the data clusters, both of which are determined from the unique identifier of the power device and the measurement type.

17. The system of claim 16, further comprising a plurality of memory point indexes built by the DCM server in a memory, the memory point indexes providing a database identifier index having correlation between the cluster identifier of the one of the data clusters, the in-cluster identifier of a location included in the memory, the unique identifier of the particular power device and the measurement type.

18. The system of claim 15, wherein the measurement type is indicative of a category of electrical data, wherein a specific part of the measured electrical data of the particular power device identified by the unique identifier is selected as the measurement point data by being within the category of electrical data indicated by the measurement type.

19. The system of claim 15, wherein the execution unit is generated as a separate execution unit for each request.

20. The system of claim 15, wherein the data clusters comprise: a real-time data cluster; a sub-real-time data cluster; and an event and other data cluster; each storing a different type of data based on the characteristics and a plurality of partition rules, the partition rules comprising a rule to divide data to one of the data clusters based on a source of the data.

21. The system of claim 15, wherein the particular power device included in the power grid is configured for operation in at least one of electric power generation, electric power transmission, or electric power distribution.

* * * * *